US010972857B2

(12) United States Patent
Martin et al.

(10) Patent No.: US 10,972,857 B2
(45) Date of Patent: Apr. 6, 2021

(54) DIRECTIONAL AUDIO SELECTION

(71) Applicant: Bose Corporation, Framingham, MA (US)

(72) Inventors: Keith Dana Martin, Westborough, MA (US); Todd Richard Reily, North Reading, MA (US); Mark Raymond Blewett, Worcester, MA (US); Daniel M. Gauger, Jr., Berlin, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/782,685

(22) Filed: Feb. 5, 2020

(65) Prior Publication Data
US 2020/0178017 A1 Jun. 4, 2020

Related U.S. Application Data

(63) Continuation of application No. 16/224,947, filed on Dec. 19, 2018, now Pat. No. 10,575,118, which is a
(Continued)

(51) Int. Cl.
*H04R 5/02* (2006.01)
*H04S 7/00* (2006.01)
(Continued)

(52) U.S. Cl.
CPC ............. *H04S 7/304* (2013.01); *G06F 3/011* (2013.01); *G06F 3/012* (2013.01); *G06F 3/013* (2013.01);
(Continued)

(58) Field of Classification Search
CPC ......... H04S 7/304; H04W 4/38; H04W 4/029; G06F 3/011; G06F 3/012
See application file for complete search history.

(56) References Cited

U.S. PATENT DOCUMENTS 9,313,359 B1      4/2016  Stojancic et al.
10,353,532 B1 *   7/2019  Holz ..................... G06F 3/0482
(Continued)

FOREIGN PATENT DOCUMENTS

EP      2811389 A1     12/2014

OTHER PUBLICATIONS

The Virtual 4D Menu, published by Bragi, available via YouTube on May 16, 2017 (screen shot included), available at: https://www.youtube.com/watch?v=VH1eTNWfqKY.
(Continued)

*Primary Examiner* — Simon King
(74) *Attorney, Agent, or Firm* — Hoffman Warnick LLC

(57) ABSTRACT

Various implementations include wearable audio devices and related methods for controlling such devices. In some particular implementations, a computer-implemented method of controlling a wearable audio device includes: receiving an initiation command to initiate a spatial audio mode; providing a plurality of audio choices corresponding with spatially delineated zones in an array defined relative to a physical position of the wearable audio device, in response to the initiation command, wherein each audio choice is associated with a prescribed action; receiving a selection command selecting one of the plurality of audio choices; and taking one of the prescribed actions in response to receiving the selection command.

20 Claims, 8 Drawing Sheets

Related U.S. Application Data continuation of application No. 15/908,183, filed on Feb. 28, 2018, now Pat. No. 10,194,259.

(51) Int. Cl.
| | | |
|---|---|---|
| *H04W 4/029* | (2018.01) | |
| *G06F 3/01* | (2006.01) | |
| *G06F 3/16* | (2006.01) | |
| *H04W 4/38* | (2018.01) | |
| *H04W 4/02* | (2018.01) | |
| *G06K 9/00* | (2006.01) | |
| *H04R 25/00* | (2006.01) | |
| *G06F 3/0482* | (2013.01) | |
| *H04R 1/10* | (2006.01) | |
| *G06F 3/0484* | (2013.01) | |

(52) U.S. Cl.
CPC ........ *G06F 3/0482* (2013.01); *G06F 3/04842* (2013.01); *G06F 3/165* (2013.01); *G06F 3/167* (2013.01); *G06K 9/00335* (2013.01); *H04R 1/1041* (2013.01); *H04R 25/556* (2013.01); *H04W 4/027* (2013.01); *H04W 4/029* (2018.02); *H04W 4/38* (2018.02); *G06K 9/00671* (2013.01); *H04R 1/1016* (2013.01); *H04R 25/552* (2013.01); *H04R 2410/05* (2013.01); *H04R 2420/07* (2013.01)

(56) References Cited

U.S. PATENT DOCUMENTS

| | | | |
|---|---|---|---|
| 2010/0106508 A1* | 4/2010 | Malesky, II | H04N 21/8113 704/500 |
| 2011/0153044 A1* | 6/2011 | Lindahl | G06F 3/167 700/94 |
| 2016/0071526 A1 | 3/2016 | Wingate et al. | |
| 2016/0198282 A1 | 7/2016 | Kim et al. | |
| 2017/0245124 A1 | 8/2017 | Child et al. | |
| 2018/0046874 A1 | 2/2018 | Guo et al. | |
| 2018/0146198 A1 | 5/2018 | Atluru et al. | |
| 2019/0025416 A1 | 1/2019 | Celinski et al. | |
| 2019/0049968 A1 | 2/2019 | Dean et al. | |
| 2019/0212828 A1* | 7/2019 | Kin | G06F 3/04815 |
| 2020/0034011 A1* | 1/2020 | Shen | G06F 3/012 |

OTHER PUBLICATIONS

PCT International Search Report and Written Opinion for International Application No. PCT/US2019/019768, dated Apr. 25, 2019, 18 pages.

\* cited by examiner

DIRECTIONAL AUDIO SELECTION

PRIORITY CLAIM

This application is a continuation application of pending U.S. patent application Ser. No. 16/224,947, filed on Dec. 19, 2018, which is a continuation application of now-issued U.S. Pat. No. 10,194,259 (filed on Feb. 28, 2018), each of which is hereby incorporated by reference in its entirety.

TECHNICAL FIELD

This disclosure generally relates to audio devices. More particularly, the disclosure relates to audio devices, such as wearable audio devices, including a directional audio selection engine for providing location-specific audio to the user at the wearable audio device.

BACKGROUND

Portable electronic devices, including headphones and other wearable audio systems are becoming more commonplace. However, the user experience with these audio systems is limited by the inability of these systems to adapt to different environments and locations. Additionally, although many of these audio systems are wirelessly paired with an audio gateway such as a mobile phone or other communications equipment, many control commands are still performed using the audio gateway's interface. This can further hinder the user experience.

SUMMARY

All examples and features mentioned below can be combined in any technically possible way.

Various implementations include methods of controlling wearable audio devices to enable directional audio selection. In other implementations, a system for controlling a wearable audio device is disclosed.

In some particular aspects, a computer-implemented method of controlling a wearable audio device includes: receiving an initiation command to initiate a spatial audio mode; providing a plurality of audio samples corresponding with spatially delineated zones in an array defined relative to a physical position of the wearable audio device, in response to the initiation command, where each audio sample is associated with a source of audio content; receiving a selection command selecting one of the plurality of audio samples; and initiating playback of the source of audio content associated with the selected audio sample.

In other particular aspects, a system includes: a wearable audio device having: an acoustic transducer having a sound-radiating surface for providing an audio output; and a control system coupled with the wearable audio device, the control system configured to: receive an initiation command to initiate a spatial audio mode; provide, for playback at the acoustic transducer, a plurality of audio samples corresponding with spatially delineated zones in an array defined relative to a physical position of the wearable audio device, in response to the initiation command, where each audio sample is associated with a source of audio content; receive a selection command selecting one of the plurality of audio samples; and initiate playback of the source of audio content associated with the selected audio sample at the acoustic transducer.

In additional particular aspects, a computer-implemented method of controlling a wearable audio device includes: receiving an initiation command to initiate a spatial audio mode; providing a plurality of audio samples corresponding with spatially delineated zones in an array defined relative to a physical position of the wearable audio device, in response to the initiation command, where each audio sample is associated with a source of audio content; receiving a selection command selecting one of the plurality of audio samples; and in response to the selection command, either initiating playback of the source of audio content associated with the selected audio sample, or providing a subsequent plurality of audio samples corresponding with the spatially delineated zones in the array, where each of the subsequent plurality of audio samples is associated with the selected audio sample.

In further particular implementations, a computer-implemented method of controlling a wearable audio device includes: receiving inertial information indicating a current physical position of the wearable audio device; predicting a future physical position of the wearable audio device from the inertial information; and rendering at least one audio sample associated with the predicted future physical position at the wearable audio device prior to or during movement of the wearable audio device from the current physical position to the predicted future physical position.

In additional particular aspects, a computer-implemented method of controlling a wearable audio device includes: receiving an initiation command to initiate a spatial audio mode; providing a plurality of audio samples corresponding with spatially delineated zones in an array defined relative to a physical position of the wearable audio device, in response to the initiation command, wherein each audio sample is associated with a source of audio content; receiving inertial information indicating a current physical position of the wearable audio device from an inertial measurement unit (IMU); predicting a future physical position of the wearable audio device from the inertial information; and rendering the plurality of audio samples prior to movement of the wearable audio device from the current physical position to the predicted future physical position, wherein at least one of the plurality of rendered audio samples is associated with the predicted future physical position of the wearable audio device, where audibility of the rendered plurality of audio samples is controlled based upon the current physical position and the predicted future physical position of the wearable audio device.

In further particular cases, a system includes: a wearable audio device having: an acoustic transducer having a sound-radiating surface for providing an audio output; and an inertial measurement unit (IMU); and a control system coupled with the wearable audio device, the control system configured to: receive inertial information from the IMU indicating a current physical position of the wearable audio device; predict a future physical position of the wearable audio device from the inertial information; and render at least one audio sample associated with the predicted future physical position at the acoustic transducer prior to or during movement of the wearable audio device from the current physical position to the predicted future physical position.

In additional particular aspects, a computer-implemented method of controlling a wearable audio device includes: receiving an initiation command to initiate a spatial audio mode; providing a plurality of audio choices corresponding with spatially delineated zones in an array defined relative to a physical position of the wearable audio device, in response to the initiation command, wherein each audio choice is associated with a prescribed action; receiving a selection command selecting one of the plurality of audio choices; and taking one of the prescribed actions in response to receiving the selection command.

In further particular aspects, a system includes: a wearable audio device having: an acoustic transducer having a sound-radiating surface for providing an audio output; and a control system coupled with the wearable audio device, the control system configured to: receive an initiation command to initiate a spatial audio mode; provide a plurality of audio choices corresponding with spatially delineated zones in an array defined relative to a physical position of the wearable audio device, in response to the initiation command, wherein each audio choice is associated with a prescribed action; receive a selection command selecting one of the plurality of audio choices; and take one of the prescribed actions in response to receiving the selection command.

Implementations may include one of the following features, or any combination thereof.

In some aspects, the plurality of audio choices include audio samples associated with sources of audio content, and the prescribed action includes playing the source of the audio content associated with an audio choice in response to receiving the selection command.

In particular cases, the plurality of audio choices are settings-specific.

In certain implementations, the plurality of audio choices are specific to a detected location of the wearable audio device.

In some cases, the plurality of audio choices include at least one of: music choices, navigation or directional choices, news source choices, audio messages, general information about a detected location of the wearable audio device, safety alerts, audio pins specific to the detected location of the wearable audio device, or audio beacons.

In certain aspects, the prescribed action includes playing additional audio content associated with each of the plurality of audio choices.

In particular implementations, the plurality of audio choices include product ordering choices, and the prescribed actions include ordering a product associated with each of the product ordering choices.

In some cases, providing the plurality of audio choices comprises initiating playback of an audio choice corresponding with each of the spatially delineated zones as the physical position of the wearable audio device moves between the spatially delineated zones in the array.

In certain implementations, the spatially delineated zones are arranged in a pattern in the array based upon a characteristic of the source of the audio choices.

In particular aspects, a user of the wearable audio device, upon initiating the spatial audio mode, is provided with a first one of the plurality of audio choices corresponding with a first one of the spatially delineated zones in the array defined relative to the physical position of the wearable audio device, and in response to a change in the physical position of the wearable audio device to a physical position associated with a second one of the spatially delineated zones, a second one of the plurality of audio choices is provided at the wearable audio device.

In particular cases, the source of audio content associated with the selected audio sample includes at least one of: a playlist of audio files, an audio stream, or an Internet radio station.

In certain implementations, the initiation command includes at least one of a tactile actuation, gesture actuation or a voice command at the wearable audio device or another device, and the selection command includes at least one of a tactile actuation, gesture actuation, or voice command at the wearable audio device or another device.

In some cases, providing the plurality of audio samples includes initiating playback of an audio sample corresponding with each of the spatially delineated zones as the physical position of the wearable audio device moves between the spatially delineated zones in the array.

In particular implementations, in response to the initiation command, providing the plurality of audio samples includes providing a band-limited playback of each of the plurality of audio samples, and in response to the selection command, the playback of the source of audio content associated with the selected audio sample includes a full-bandwidth playback of the source of audio content. In certain cases, the band-limited playback includes a spatially rendered playback of monaural sources, and the full-bandwidth playback includes a stereo playback.

In some implementations, the array of spatially delineated zones includes a one-dimensional array or a two-dimensional array, and a size of each of the spatially delineated zones is either equally distributed or unequally distributed in the array.

In particular cases, the spatially delineated zones are arranged in a pattern in the array based upon a characteristic of the source of the audio content.

In certain implementations, the computer-implemented method further includes selecting the plurality of audio samples corresponding with the spatially delineated zones based upon a location of the wearable audio device. In some cases, the location of the wearable audio device is determined based upon inertial information from an inertial measurement unit (IMU) located at the wearable audio device or at another device.

In particular implementations, the plurality of audio samples corresponding with the spatially delineated zones are based upon at least one preset associated with a user of the wearable audio device.

In certain cases, the computer-implemented method further includes: receiving inertial information indicating a current physical position of the wearable audio device from an inertial measurement unit (IMU); predicting a future physical position of the wearable audio device from the inertial information; and rendering the plurality of audio samples prior to movement of the wearable audio device from the current physical position to the predicted future physical position, where audibility of the rendered plurality of audio samples is controlled based upon the current physical position and the predicted future physical position of the wearable audio device. In particular implementations, at least one of the rendered plurality of audio samples is at least one of paused or inaudible to a user of the wearable audio device while a distinct one of the rendered plurality of audio samples is audible to the user of the wearable audio device.

In some cases, a user of the wearable audio device, upon initiating the spatial audio mode, is provided with a first one of the plurality of audio samples corresponding with a first one of the spatially delineated zones in the array defined relative to the physical position of the wearable audio device, and in response to a change in the physical position of the wearable audio device to a physical position associated with a second one of the spatially delineated zones, a second one of the plurality of audio samples is provided at the wearable audio device. In certain implementations, a transition between the first one of the plurality of audio samples and the second one of the plurality of audio samples includes a fade in-fade out transition.

In particular cases, providing the plurality of audio samples includes overlaying an audio prompt including a descriptor of content in each of the audio samples.

In some implementations, the system further includes: a tactile sensor coupled with the control system; and an inertial measurement unit (IMU) coupled with the control system, where the initiation command includes a tactile actuation at the tactile sensor, and the selection command includes at least one of a tactile actuation at the tactile sensor or a gesture actuation detectable by the IMU.

In certain cases, at least a portion of the control system is located at an audio gateway connected with the wearable audio device.

In particular implementations, the plurality of audio samples includes a parent directory of the associated sources of audio content, and where the subsequent plurality of audio samples comprises a child directory of the parent directory.

In some aspects, the inertial information indicates a relative position of the wearable audio device and an absolute movement of the wearable audio device from the relative position.

In certain cases, the absolute movement of the wearable audio device includes at least one of a positional change or an orientation change.

In particular implementations, predicting the future physical position of the wearable audio device includes using a Kalman Filter to predict a position of a head of a user of the wearable audio device, where the Kalman Filter predicts the future physical position of the wearable audio device using data describing a current position of the wearable audio device and data indicating a velocity of the wearable audio device.

In some aspects, rendering the at least one audio sample at the wearable audio device prior to or during movement of the wearable audio device from the current physical position to the predicted future physical position controls latency between playback of the at least one audio sample and playback of a complete audio file or audio stream associated with the at least one audio sample in response to a user selection command.

In particular cases, the method further includes, prior to receiving the inertial information indicating the current physical position of the wearable audio device: receiving an initiation command to initiate a spatial audio mode; and in response to the initiation command, providing a plurality of audio samples including the at least one audio sample and corresponding with spatially delineated zones in an array defined relative to the current physical position of the wearable audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
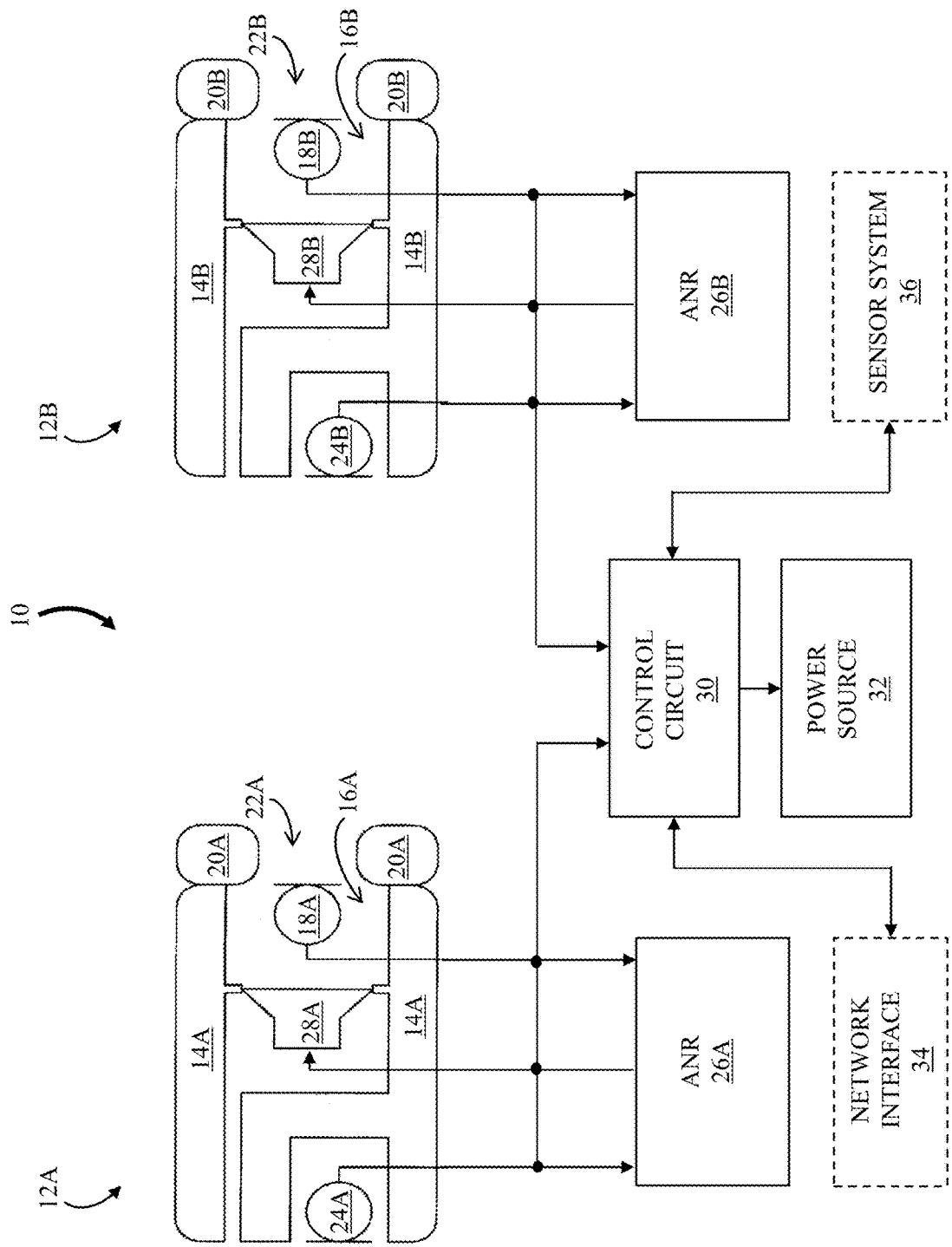
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a directional audio selection system can be beneficially incorporated into a wearable audio device to provide for added functionality. For example, a directional audio selection system can enable, among other things, audio source selection using gestures or inertial commands.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be acoustically presented with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling directional audio selection functions according to various particular implementations. It is understood that portions of the control circuit 30 (e.g., instructions) could also be stored in a remote location or in a distributed location, and could be fetched or otherwise obtained by the control circuit 30 (e.g., via any communications protocol described herein) for execution. The instructions may include instructions for controlling directional audio selection-based processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include inner microphones 18 and/or outer microphones 24, sensors for detecting inertial conditions at the personal audio device and/or conditions of the environment proximate personal audio device 10 as described herein. The sensors may be on-board the personal audio device 10, or may be remote or otherwise wireless (or hard-wired) connected to the personal audio device 10. As described further herein, sensor system 36 can include a plurality of distinct sensor types for detecting inertial information, environmental information, or commands at the personal audio device 10. In particular implementations, sensor system 36 can enable detection of user movement, including movement of a user's head or other body part(s). In particular, portions of sensor system 36 may incorporate one or more movement sensors, such as accelerometers gyroscopes and/or magnetometers. In some particular implementations, sensor system 36 can include a single IMU having three-dimensional (3D) accelerometers, gyroscopes and a magnetometer.

Advances in MEMS (microelectromechanical systems) technologies have enabled the manufacture of relatively low cost multi-axis accelerometers, gyroscopes, and magnetometers of small size and having relatively low power consumption using processes based on those employed in the microelectronics industry. Developments in this field have also resulted in the creation of relatively low cost MEMS devices that combine a multi-axis accelerometer, gyroscope, and/or magnetometer (sometimes referred to as an IMU or inertial measurement unit). In employing accelerometer(s), gyroscope(s) and/or magnetometer(s) in sensor system 36 to detect movement and/or orientation, and in employing these observations concerning movement of the human body, it is possible both to detect movement imparted to the personal audio device 10 and to distinguish instances of that movement being caused by a user of that personal audio device 10 from instances of that movement being caused by some other influence. For example, where a user is traveling in a vehicle, it is possible to distinguish between movement made by the user from movement made by the vehicle. In this way, it is possible to detect that a personal audio device 10 is not in position on a user's head or body, even if that personal audio device 10 has been placed on a seat or elsewhere in moving vehicle, despite the fact that a moving vehicle will subject the personal audio device 10 to changes in acceleration and/or orientation as the vehicle moves.

In various implementations, the sensor system 36 can be located at the personal audio device 10, e.g., where an IMU is physically housed in the personal audio device 10. In some examples, the sensor system 36 (e.g., including the IMU) is configured to detect a position, or a change in position, of the personal audio device 10. This inertial information can be used to control various functions described herein. For example, the inertial information can be used to trigger a command function, such as activating an operating mode of the personal audio device 10 (e.g., a spatial audio mode), modify playback of an audio sample in the spatial audio mode, or initiate playback of audio content associated with one or more samples.

The sensor system 36 can also include one or more interface(s) for receiving commands at the personal audio device 10. For example, sensor system 36 can include an interface permitting a user to initiate functions of the personal audio device 10. In a particular example implementation, the sensor system 36 can include, or be coupled with, a capacitive touch interface for receiving tactile commands on the personal audio device 10.

In other implementations, as illustrated in the phantom depiction in FIG. 1, one or more portions of the sensor system 36 can be located at another device capable of indicating inertial information about the user of the personal audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where personal audio device 10 includes headphones and an IMU is located in a pair of glasses, a watch or other wearable electronic device.

According to various implementations, the audio playback devices (which may be, for example, personal audio device 10 of FIG. 1) described herein can be configured to operate in a spatial audio mode according to one or more factors. These particular implementations can allow a user to select between a plurality of choices conveyed to a user via audio, for example a plurality of audio playback sources, using directional commands detectable at the personal audio device 10, or another device connected with the personal audio device 10. In some cases, these implementations allow a user to sample a plurality of audio content sources and select audio content source(s) for playback using inertial commands. These inertial commands can be executed at the personal audio device 10 (or another connected device), and can permit control of audio playback without the need to interface with an audio gateway device (e.g., a mobile phone, personal computer (PC), e.g., tablet), or provide voice commands to a control device. These implementations can enhance the user experience in comparison to conventional audio systems, e.g., audio systems requiring commands at an audio gateway interface or voice commands at a control device.

Figure 2:
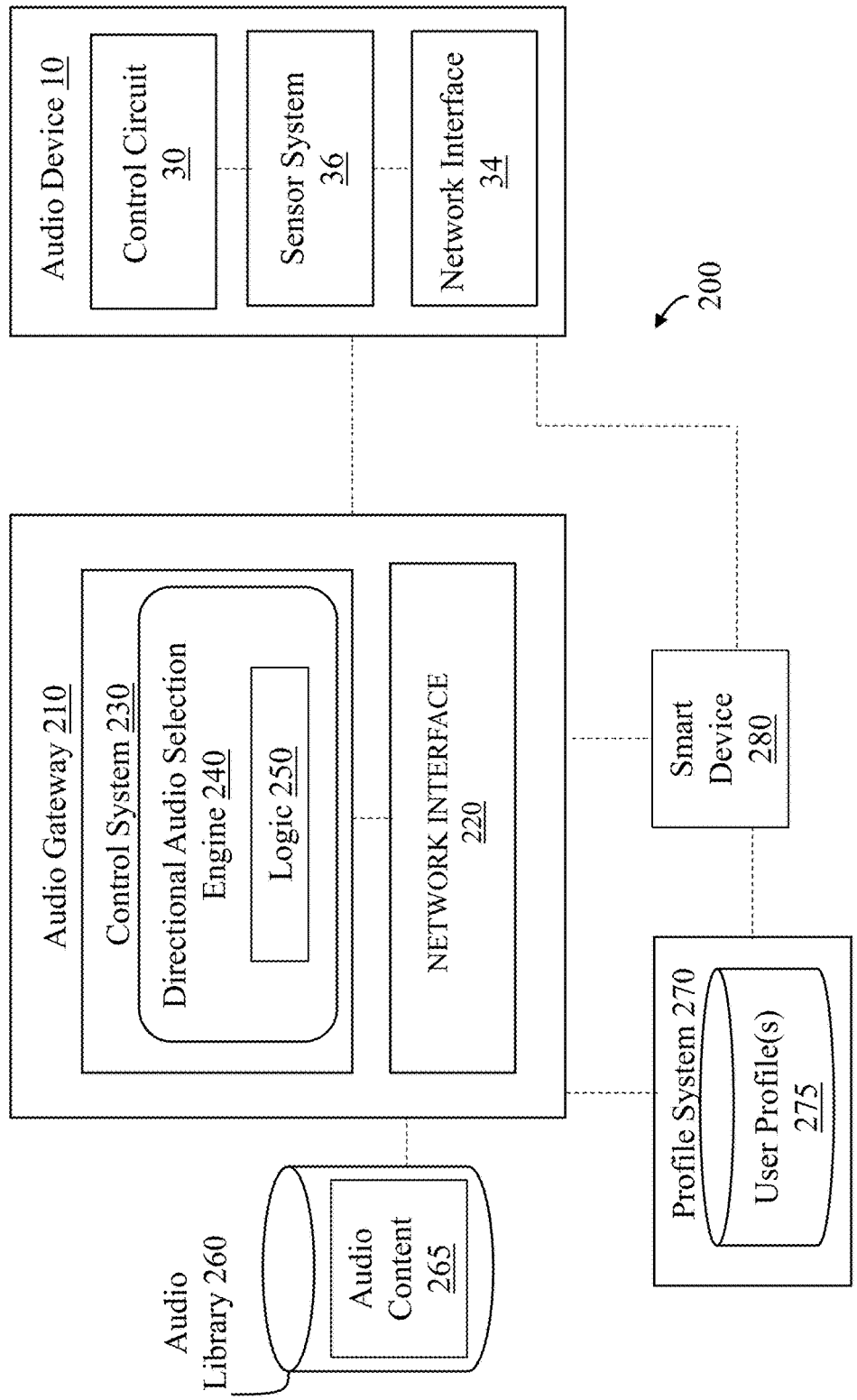
FIG. 2 shows a schematic depiction of data flows in a system including the personal audio device of FIG. 1, connected with an audio gateway device, according to various implementations.

As described with respect to FIG. 1, control circuit 30 can execute (and in some cases store) instructions for controlling directional audio selection in personal audio device 10 and/or other audio playback devices in a network of such devices. FIG. 2 shows a schematic depiction of data flows in a system 200 including the personal audio device (or simply, audio device) 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include similar network interface components as described with reference to the network interface 34 of audio device 10, e.g., a wireless transceiver configured to communicate over any wireless protocol described herein. Audio gateway 210 can further include a control system 230 configured to execute control functions in the spatial audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide directional audio selection functions described herein.

In particular implementations, control system 230 includes a directional audio selection engine 240 or otherwise accesses program code for executing processes performed by directional audio selection engine 240 (e.g., via network interface 220). Directional audio selection engine 240 can include logic 250 for executing functions described herein. Both audio gateway 210 and audio device 10 are shown in simplified form in FIG. 2 to focus illustration on functions described according to the directional audio selection engine 240. Directional audio selection engine 240 can be configured to implement modifications in audio outputs at the transducer (e.g., speaker) 28 (FIG. 1) at the audio device 10 in response to receiving inertial information from the audio device 10 (e.g., the IMU or other sensor in sensor system 36). In various particular embodiments, directional audio selection engine 240 is configured to receive inertial information (in the form of sensor data) about a movement, change in location (e.g., via a global positioning system (GPS)), orientation (e.g., via a multi-degree-of-freedom IMU), or tactile actuation from sensor system 36, and send instructions to the control circuit 30 at the audio device 10 to modify the audio output at transducer(s) 28 based upon that inertial information.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations.

In particular implementations, the logic 250 in directional audio selection engine 240 is configured to process sensor data from the audio device 10 and execute various functions. For example, the directional audio selection engine 240 is configured to receive an initiation command from the audio device 10 (e.g., receive an indication, via sensor system 36, that a user has provided an initiation command) to initiate a spatial audio mode. In response to that initiation command, the directional audio selection engine 240 can provide (e.g., via transducer(s) 28 at audio device 10) a plurality of audio samples, information, or choices corresponding with spatially delineated zones in an array that is defined relative to a physical position of the audio device 10. In one example, the presented audio samples (e.g., including samples of content, information about content, or choices between content) can be associated with a source of audio content. After initiating the spatial audio mode including providing the audio samples at audio device 10, the directional audio selection engine 240 can further receive a selection command (e.g., via sensor system 36) selecting one of those audio samples for playback of associated audio content. In response to that selection command, the directional audio selection engine 240 can initiate playback (e.g., via transducer(s) 28 at audio device 10) of the respective content. For example, in the case of audio samples, the directional audio selection engine 240 can initiate playback of the source of audio content associated with the selected sample or information. This can includes scenarios where audio samples include choices or information associated with audio content.

Directional audio selection engine 240 (including logic 250, related software and/or hardware) can be located at the audio device 10, audio gateway 210 or any other device described herein (e.g., smart device 280). That is, directional audio selection engine 240 can be configured to execute functions at one or more devices and/or components described herein. In some cases, the directional audio selection engine 240 may take the form of an entirely hardware implementation, an entirely software implementation (including firmware, resident software, micro-code, etc.) or an implementation combining software and hardware aspects that may all generally be referred to herein as an "engine." Additionally, the directional audio selection engine 240 may take the form of a computer program product embodied in any tangible medium of expression having computer-usable program code embodied in the medium. In various particular implementations, the directional audio selection engine 240 executes functions described herein according to logic 250, which can be stored or otherwise accessed by any device capable of performing those functions, e.g., audio gateway 210, audio device 10 or other device(s) described herein.

Directional audio selection engine 240 can be coupled (e.g., wirelessly and/or via hardwired connections in personal audio device 10) with an audio library 260, which can include audio content 265 (e.g., audio file(s), playlist(s) of audio files, podcast(s), an audio stream or an Internet radio station, location-specific audio pins, one or more audibly presented selections) for playback (e.g., streaming) at audio device 10 and/or a profile system 270 including user profiles 275 about one or more user(s). Audio library 260 can include any library associated with digital audio sources accessible via network interfaces 34 and/or 220 described herein, including locally stored, remotely stored or Internet-based audio libraries.

In particular implementations, as noted herein, audio content 265 can include any audibly presentable material that can be provided to the user after selection in the spatial audio mode. As described herein, audio content 265 can be presented to the user with one or more associated audio samples, which may include a portion (or all) of the audio content 265, or any other associated audibly presentable material. That is, in certain cases, the term "audio sample" can refer to any audibly presented material associated with audio content 265, and can include a portion of audio content 265, or other audibly presented material altogether, which indicates the source of that content 265. This sample need not be a part of the underlying audio content 265, and may merely serve to identify audio content 265 and/or its source. In some example implementations, when the user activates the spatial audio mode, directional audio selection engine 240 provides the user with audio samples in an array of spatially delineated zones. The user can select between these samples in the array to actuate additional functions of the directional audio selection engine 240, e.g., to initiate playback of the source of audio content 265 associated with the selected audio sample. Samples (and associated content 265) can include music choices, navigation/direction choices, news source choices, audio messages, general information about a location, safety alerts, location-specific audio pins, audio beacons, etc. Additional description of audio pins, location-specific messages, audio beacons and related content can be found in U.S. Provisional Patent Application No. 62/626,967, which is hereby incorporated by reference in its entirety.

As noted herein, in various implementations, the samples (and associated content 265) can be settings-specific, location-specific or otherwise tailored to particular user experiences. In some cases, directional audio selection engine 240 presents samples (and associated content 265) to the user that are related to a particular location, e.g., when the user approaches that location. In example implementations, when a user is at an intersection, directional audio selection engine 240 can present audio prompts, beacons or other indicators to the user based upon the direction in which the user is facing (detected according to various implementations described herein). For example, when the user at an intersection activates the spatial audio mode (or has already activated the spatial audio mode or otherwise triggers settings to activate spatial audio mode), looking left can provide an audio sample (e.g., an audio prompt or audio beacon) indicating areas of interest in that direction. Looking right can trigger directional audio selection engine 240 to provide an audio sample indicating areas of interest in that direction. Additionally, looking straight ahead can trigger directional audio selection engine 240 to provide an audio sample indicating areas of interest in that direction. It these cases, an audio sample can provide introductory information about audio content 265 associated with one or more of the directions. In the intersection example: a) when looking right (during operation of the spatial audio mode), directional audio selection engine 240 can provide an audio sample such as: "Fenway Park is 0.5 miles from your current location in this direction; nod your head to hear highlights from last night's game"; b) when looking left (during operation of the spatial audio mode), directional audio selection engine 240 can provide an audio sample such as: "Boston's Public Garden is 0.4 miles from your current location in this direction; tap your audio device to hear fun facts about this historic public gathering place"; and/or c) when looking straight ahead (during operation of the spatial audio mode), directional audio selection engine 240 can provide an audio sample such as: "You are two blocks from Newbury Street; walk forward to hear a listing of top-rated restaurants for lunch." It is understood that this example is merely illustrative of the various array layouts and audio sample types that can be utilized by directional audio selection engine 240 in spatial audio mode. Various additional example implementations are described herein.

User profiles 275 may be user-specific, community-specific, device-specific, location-specific or otherwise associated with a particular entity such as the user. User profiles 275 can include user-defined playlists of digital music files, audio messages stored by the user of audio device 10, or another user, or other audio content available from network audio sources coupled with network interfaces 34 and/or 220, such as network-attached storage (NAS) devices, and/or a DLNA server, which may be accessible to the audio gateway 210 and/or audio device 10 over a local area network such as a wireless (e.g., Wi-Fi) or wired (e.g., Ethernet) home network, as well as Internet music services such as Pandora®, vTuner®, Spotify®, etc., which are accessible to the audio gateway 210 and/or audio device 10 over a wide area network such as the Internet. In some cases, profile system 270 is located in a local server or a cloud-based server, similar to any such server described herein. User profile 275 may include information about frequently played audio content associated with the user of audio device 10 or other similar users (e.g., those with common audio content listening histories, demographic traits or Internet browsing histories), "liked" or otherwise favored audio content associated with the user or other similar users, frequency with which particular audio content is changed by the user or other similar users, etc. Profile system 270 can be associated with any community of users, e.g., a social network, subscription-based music service (such as a service providing audio library 260), and may include audio preferences, histories, etc. for the user as well as a plurality of other users. In particular implementations, profile system 270 can include user-specific preferences (as profiles 275) for messages and/or related notifications (e.g., prompts, audio overlays). Profiles 275 can be customized according to particular user preferences, or can be shared by users with common attributes.

Directional audio selection engine 240 can also be coupled with a smart device 280 that has access to a user profile (e.g., profile 275) or biometric information about the user of audio device 10. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. In some example implementations, smart device 280 can be utilized for: connecting audio device 10 to a Wi-Fi network; creating a system account for the user; setting up music and/or location-based audio services; browsing of content for playback; setting preset assignments on the audio device 10 or other audio playback devices; transport control (e.g., play/pause, fast forward/rewind, etc.) for the audio device 10; and selecting one or more audio devices 10 for content playback (e.g., single room playback or synchronized multi-room playback). In some cases, smart device 280 may also be used for: music services setup; browsing of content; setting preset assignments on the audio playback devices; transport control of the audio playback devices; and selecting audio devices 10 (or other playback devices) for content playback. Smart device 280 can further include embedded sensors for measuring biometric information about user, e.g., travel, sleep or exercise patterns; body temperature; heart rate; or pace of gait (e.g., via accelerometer(s). In various implementations, one or more functions of the directional audio selection engine 240 can be executed at smart device 280. Further, it is understood that audio gateway 210 can include any manner of smart device described herein.

As described herein, directional audio selection engine 240 is configured to receive sensor data about one or more conditions at the audio device 10 from sensor system 36. In various particular implementations, the sensor system 36 can include an IMU for providing inertial information about the audio device 10 to the directional audio selection engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In additional implementations, sensor system 36 can include additional sensors for detecting conditions at the audio device, for example: a position tracking system; and a microphone (e.g., including one or more microphones). These sensors are merely examples of sensor types that may be employed according to various implementations. It is further understood that sensor system 36 can deploy these sensors in distinct locations and distinct sub-components in order to detect particular environmental information relevant to user of audio device 10.

In certain cases, the position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user and/or the audio device 10. In this sense, the IMU may form part of the position tracking system. However, in other implementations, orientation tracking can be performed via other components in the position tracking system, e.g., a separate head-tracking or body-tracking system (e.g., an optical-based tracking system, accelerometer, magnetometer, gyroscope or radar) for detecting a direction in which the user is facing, as well as movement of the user and the audio device 10. The position tracking system can be configured to detect changes in the physical location of the audio device 10 and/or the user (where the user is separated from audio device 10) and provide updated sensor data to the directional audio selection engine 240 in order to indicate a change in the location of the user. Position tracking system can also be configured to detect the orientation of the user, e.g., a direction of the user's head, or a change in the user's orientation such as a turning of the torso or an about-face movement. In these examples, the IMU at audio device 10 may be particularly useful in detecting changes in user orientation. However, it is understood that the position tracking system could also include one or more optical or visual detection systems located at the audio device 10 or another device (e.g., the audio gateway 210 and/or smart device 280) configured to detect the orientation of the user.

In some example implementations, this position tracking system (e.g., IMU) can detect that the user has changed the orientation of his/her head while the spatial audio mode is active, and can send that sensor data (e.g., inertial information) to the directional audio selection engine 240. In particular example implementations, the position tracking system can utilize one or more location systems and/or orientation systems to determine the location and/or orientation of the user, e.g., relying upon a GPS location system for general location information and an IR location system for more precise location information, while utilizing a head or body-tracking system such as the IMU to detect a direction of the user's viewpoint. In any case, the position tracking system can provide sensor data to the directional audio selection engine 240 about the position (e.g., location and/or orientation) of the user.

In some cases, the IMU, which can include an accelerometer/gyroscope/magnetometer, can include distinct accelerometer components gyroscope components and/or magnetometer components, or could be collectively housed in a single sensor component. This component may be used to sense gestures based on movement of the user's body (e.g., head, torso, limbs) while the user is wearing the audio device 10 or interacting with another device (e.g., smart device 280) connected with audio device 10. As with any sensor in sensor system 36, accelerometer(s)/gyroscope(s)/magnetometer(s) may be housed within audio device 10 or in another device connected to the audio device 10. In some example implementations, the accelerometer(s)/gyroscope(s)/magnetometer(s) can detect inertial information about the user, e.g., an acceleration of the user and/or audio device 10 or a deceleration of the user and/or audio device 10.

The microphone (which can include one or more microphones, or a microphone array) in sensor system 36 can have similar functionality as the microphone(s) 18 and 24 shown and described with respect to FIG. 1, and may be housed within audio device 10 or in another device connected to the audio device 10. Microphone(s) can be positioned to receive ambient audio signals (e.g., audio signals proximate audio device 10) or audio signals within audio device 10 (e.g., audio signals near a wearer's ear canal). In some cases, ambient audio signals include speech/voice input from the user to enable voice control functionality, or to initiate a spatial audio mode. In some other example implementations, the microphone(s) can detect the voice of the user of audio device 10 and/or of other users proximate to or interacting with the user. In particular implementations, directional audio selection engine 240 is configured to analyze one or more voice commands from user (via microphone(s)), and modify the audio output at the audio device 10 (e.g., via transducer(s) 28) based upon that command. In some cases, the microphone(s) can allow the user to initiate a spatial audio mode at the audio device 10 using a voice command at microphone(s) 18 and 24 at audio device 10, or at other microphone(s) on another device (e.g., smart device 280 and/or audio gateway 210). In some examples, the user can provide a voice command to the directional audio selection engine 240, e.g., to control the spatial audio mode. In these cases, logic 250 can include logic for analyzing voice commands, including, e.g., natural language processing (NLP) logic or other similar logic.

It is understood that any number of additional sensors could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

In additional implementations, the directional audio selection engine 240 could alternatively (or additionally) be configured to implement modifications in audio outputs at the transducer (e.g., speaker) 28 (FIG. 1) at audio device 10 in response to receiving additional information from audio device 10 or another connected device such as smart device 280 and/or audio gateway 210. For example, a Bluetooth beacon (e.g., BLE beacon) trigger, GPS location trigger or timer/alarm mechanism can be used to initiate the spatial audio mode at audio device 10. These triggers and mechanisms can be used in conjunction with other actuation mechanisms described herein (e.g., voice actuation, gesture actuation, tactile actuation) to initiate the spatial audio mode. In some cases, the spatial audio mode can be initiated based upon proximity to a detected BLE beacon or GPS location. In other cases, the spatial audio mode can be initiated based upon a timing mechanism, such as at particular times or intervals.

During operation, the directional audio selection engine 240 can be configured to initiate a spatial audio mode in response to an initiation command. As described herein, the initiation command can take any form capable of detection at the audio device 10, audio gateway 210 and/or smart device 280. For example, the initiation command can include a tactile actuation, gesture actuation or a voice command received at the audio device 10 or at another device such as the audio gateway 210 or the smart device 280 (e.g., via sensor system(s) described herein). In these cases, the user can initiate the spatial audio mode by speaking a command such as: "Device, activate spatial audio mode." In some cases, a trigger phrase is not necessary for an effective initiation command, and a user may simply say: "Active spatial audio mode." In other cases, the user can initiate the spatial audio mode with a tactile cue such as a tap or multi-tap actuation at the audio device 10, audio gateway 210 and/or smart device 280. In particular implementations, the tactile actuation can include a double-tap or triple-tap on any portion of the audio device 10, or on a particular interface at the audio device 10 (e.g., a capacitive touch interface). However, the user can also actuate the spatial audio mode using a tactile command (e.g., touch and pause command, tap command, swipe command) on the smart device 280, e.g., where smart device 280 includes a watch or other wearable device. In other cases, the user can initiate the spatial audio mode with a gestural cue, such as a deep head nod, which can be detected at the audio device 10 (e.g., via an IMU) or at the audio gateway 210 and/or smart device 280 (e.g., with optical sensors or proximity sensors).

The audio gateway 210 can also include an interface permitting the user to deliver an initiation command, such as a touch-screen command or push-button command. However, in some particular implementations, the user can initiate the spatial audio mode without contacting a user interface on the audio gateway 210 (e.g., without taking a smartphone out of his/her pocket). In still further implementations, the user can initiate the spatial audio mode using a gesture, such as a gesture detectable at the audio device 10 and/or smart device 280. For example, the user can initiate the spatial audio mode using a head nod or twist, in the case that the audio device 10 and/or smart device 280 includes a head tracking system. In other examples, the user can initiate the spatial audio mode using a wrist rotation or arm wave, using an IMU or other accelerometer(s)/gyroscope(s)/magnetometer(s) at the audio device 10 and/or smart device 280. In any case, the user can initiate the spatial audio mode using one or more connected devices.

Figure 3:
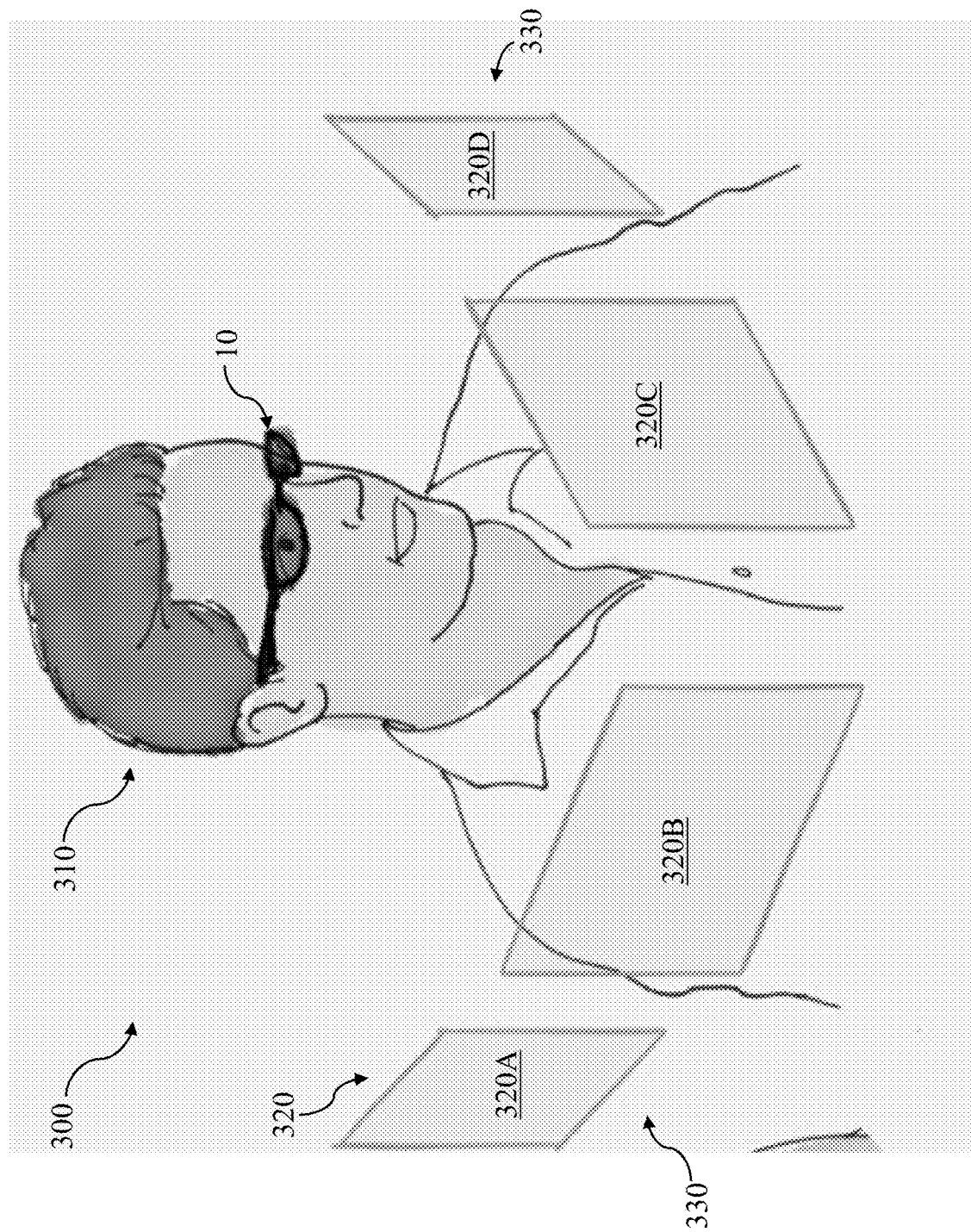
FIG. 3 shows a schematic depiction of an environment including a user interacting with the audio device of FIGS. 1 and 2, according to various implementations.

In response to the initiation command, as illustrated in the schematic depiction of an environment 300 in FIG. 3, the directional audio selection engine 240 can provide a plurality of audio samples, information, or choices (to the user 310) corresponding with spatially delineated zones 320 in an array 330 defined relative to a physical position of the audio device 10 (e.g., a wearable audio device such as glasses, in this depiction). In the case of audio samples or information, each audio sample or piece of information provided to the user can be associated with a source of audio content 265 in the audio library 260 (FIG. 2). In the case of audio choices, each audio choice provided to the user can be associated with audio content 265 in the audio library 260 (FIG. 2). In some implementations, the samples of audio content 265 can include a selection of an audio file or stream, such as a representative segment of that audio content (e.g., the chorus of a song, the introduction to an audio book, a highlight from a sporting broadcast, a description of the audio content, an audio message, a description of an audio pin, an indicator of the presence of an audio pin, an audio beacon, a source of an audio message, or any other portion of the audio content 265). In various additional implementations, the sample of audio content 265 is the entire audio content (e.g., audio file), such as in the case of a message, audio cue, audio beacon, audio pin, request for feedback, etc. In some cases, sample settings can be saved in user profile(s) 275, or default sample settings can be utilized to determine which portion(s) of audio content 265 play as samples. In additional cases, a content provider could supply location-dependent samples, context-dependent samples, a text-to-speech application navigating a directory structure, or a mono and/or band-limited copy of content streams for playback as samples. In certain cases, where the sample is only a portion of the audio content 265, a looped representative sample can be provided as the sample(s) to enhance the likelihood that the user 310 recognizes the audio content 265, or louder portions of the audio content 265 can be provided as the sample(s) to improve audibility.

With continuing reference to FIG. 2, the array 330 illustrated in FIG. 3 is merely a visual representation of each of the zones 320 (illustrated as distinct zones denoted by A, B, C, D, etc.) in which the audio sample, piece of information, or choice will play for the user 310. For example, based upon the physical position of the audio device 10 (e.g., as detected by the IMU or other sensor in sensor system 36), the directional audio selection engine 240 can provide distinct audio samples to the user 310 (e.g., at the audio device 10 or at another device such as the audio gateway 210 or smart device 280) for playback. In some particular implementations, while in the spatial audio mode, the user 310 can move his/her body (e.g., head) between the spatially delineated zones 320, and directional audio selection engine 240 will initiate playback of distinct audio samples, information, or choices corresponding with those zones 320. It is understood that these zones 320 are defined relative to a physical position of the audio device 10, such that each zone 320 can be associated with an orientation of the audio device 10. In the case of wearable audio devices, the user 310 may need only move his/her head a certain number of degrees from a first zone 320A to initiate playback of a distinct audio sample, piece of information, or choice corresponding with a distinct zone (e.g., zone 320B, 320C, 320D).

While example implementations described herein relate to head tracking between zones 320, it is understood that additional alternative implementations can employ eye tracking (e.g., via an eye tracker in sensor system 36) to permit selection of zones 320 via eye movement. In these cases, the user 310 can move his/her eyes between spatially delineated zones 320 (which may be calibrated for eye-tracking actuation), and directional audio selection engine 240 will initiate playback of distinct audio samples, information, or choices corresponding with those zones 320.

In certain implementations, as illustrated in the example environment 300 in FIG. 3, the array 330 of zones 320 can include a one-dimensional array such as a linear array corresponding with user movement across one direction (e.g., head rotation). In various implementations, the number of zones 320 in the array 330 can be determined based upon the type of audio device 10 (or other device) used to perform audio selection. For example, where the directional audio selection engine 240 detects that the audio device 10 (or other selection device) is a head, neck or body-mounted audio device 10, the number of zones 320 in the array 330 can be limited to a degree of movement corresponding with that body part. In the case of a head-mounted audio device 10 such as a pair of smart glasses or headphones, the span of the array 330 can be limited, e.g., to less than 90 degrees, 120 degrees or another range. In particular examples, the span of array 330 can be limited to approximately 45-75 degrees from the edge of its left-most zone 320A to the edge of its right-most zone 320A+X, and in particular cases, can span approximately 50-60 degrees. In additional implementations, the span of array 330 can be modified based upon a current position of the user 310, e.g., whether user is sitting versus standing. In certain cases, the span of array 330 can be larger for a user determined to be standing (e.g., via one or more inputs from sensor system 36 such as relative distance from a floor/ceiling, rate of movement, etc.) than for a user determined to be sitting (e.g., via relative distance from floor/ceiling, lack of significant movement, etc.).

It is additionally understood that the span of array 330 can be further limited by a desired number of zone selections, based upon preferences of the user 310 or default settings. For example, each zone 320 can span a certain number of degrees across a user's field of motion, so as to clearly present distinct audio sample options to the user 310. While the user 310 may be comfortably capable of up to 150 degrees of motion in a particular direction (e.g., head rotation), the user experience may be enhanced with a smaller range of motion, e.g., 50-60 degrees. Additionally, while any number of audio samples, corresponding with zones 320, could be presented across this range of motion, the range of each zone 320 can be set to a degree measurement providing for sufficient sampling as the user 310 moves between zones 320, e.g., 10-15 degrees per zone 320. In particular examples, the user 310 is presented with approximately 4-6 zones 320 spanning approximately 45-75 degrees (with each zone 320 spanning approximately 10-15 degrees).

It is further understood that in other implementations, the zones 320 can be arranged in an array that has two dimensions, e.g., a vertical and horizontal axis. This can allow the user 310 to initiate playback of audio samples in zones 320 along a first dimension and a second dimension. For example, the environment 300 illustrated in FIG. 3 could additionally include vertically aligned zones 320 in addition to the array 330 shown. In these cases, a set of zones 320 could be added to the array 330 spanning in the vertical direction such that user 310 can tilt his/her head upward or downward to initiate playback of the audio samples corresponding with zones 320 aligned along the vertical dimension relative to one or more zones 320 in array 330.

In additional implementations, the user 310 (e.g., via settings in profile(s) 275 or other actuation with directional audio selection engine 240), or settings in directional audio selection engine 240, can configure the layout of zones 320 in the array 330. For example, in response to initiating the spatial audio mode, directional audio selection engine 240 can present a first array 330 of zones 320 to the user 310 when user 310 is looking straight ahead (e.g., a neutral or rest position), a second (distinct) array 330 of zones 320 when the user 310 looks down, and a third (additionally distinct) array 330 of zones 320 when the user 310 looks up. In some particular example implementations, a first category of selection(s) is presented in the neutral or rest position (e.g., selections of radio stations for streaming), a second category of selection(s) is presented when the user 310 looks up (e.g., weather information for a city or region) and a third category of selection(s) is presented when the user 310 looks down (e.g., calendar or meeting information).

In some particular implementations, a size of the zones 320 in the array 330 can be equally distributed, such that the zones 320 have a uniform spatial dimension relative to a position of the audio device 10. For example, each zone 320 can span approximately 10-15 degrees from left to right (or, rotation direction), and approximately 15-30 degrees from top to bottom (or, tilt direction). However, in other cases, the zones 320 are unequally distributed in the array 330, such that there is a difference in size between at least two of the zones 320. This may be beneficial for terminal zones at end(s) of the array 330, or one or more zones proximate a center of the array 330. For example, the terminal zone(s) can be larger (e.g., 20-30 degrees in span along a direction of motion of the audio device 10) than neighboring or more central zones to permit "over-rotation" by the user 310 without exiting the spatial audio mode. This may be useful, e.g., where the audio device 10 moves beyond the physical position of an equally distributed array 330 of zones 320. In other cases, central zone(s) 320 can be larger than their neighboring zones 320 or terminal zones 320 based upon user preferences, profile preferences, or suggestion algorithms (or other machine learning approaches described herein). That is, a user's preferred, frequently played, or otherwise prioritized source of audio content 265 could be played as a sample at central zone(s) 320 and can be associated with a zone having a larger size than its neighboring zones. This can allow the user 310 to hear the sample of that source of audio content 265 over a greater range of motion than lesser prioritized sources of audio content 265.

In addition to size differentiation in the array 330, zones 320 can be arranged in a pattern based upon one or more characteristics of the source(s) of audio content 265. For example, audio content 265 with a priority over other audio content 265 can be associated with central zone(s) 320, such that when user 310 activates the spatial audio mode, he/she encounters a central zone 320 (or one of two central zones in the case of an even-numbered array 330 of zones 320) with an audio sample from a source of audio content 265 that is prioritized over the sample (and associated audio content 265) playing in other, tangential zone(s) 320. The characteristic of the source of audio content 265 can provide the basis for patterning, such that higher priority sources are more central to the user's perspective when the spatial audio mode initiates than lower priority sources. However, in other cases, priority could be denoted in a top-to-bottom, left-to-right, corner-to-corner or other arrangement in the array 330. Additionally, the zones 320 can be arranged in chronological order (e.g., as in the associated FM radio frequencies), alphabetical order (e.g., as in artist name, song name, author, speaker, streaming station), or in accordance with the direction the user is looking (e.g., when the user looks left, information about what is to his/her left is given; when the user looks straight, information about what is straight ahead is given; and when the user looks right, information about what is to his/her right is given), etc. Further, zones 320 can be arranged by genre (e.g., audio books by genres: Suspense, Comedy, Non-Fiction, etc.), type of information source (e.g., news, weather, music, podcasts, etc.), or other category.

In various implementations, the audio samples corresponding with zones 320 are based upon at least one preset associated with the user 310. For example, the user 310 may have profile settings (in profile 275, FIG. 2) with preset sources of audio content 265, such as a set of Internet radio stations, sports talk radio channels or audio books. The directional audio selection engine 240 can use that profile 275 (and in some cases, other data such as location and/or environmental data from sensor system 36 and/or smart device 280), to select a set of sources of audio content 265 for sample playback at the zones 320. These presets can be arranged in any manner described herein, such as alphabetically, numerically, with/without priority, etc. In any case, the characteristic(s) of the source of audio content 265 can be used to select and/or arrange zones 320 in the array 330.

As noted herein, selection of the audio samples in the array 330 can be based upon the location of audio device 10. For example, the directional audio selection engine 240 can use location data (e.g., from sensor system 36, smart device 280 and/or audio gateway 210) to determine a location of the audio device 10. Using that location data, the directional audio selection engine 240 can select audio samples for playback (e.g., at the audio device 10, smart device 280 and/or audio gateway 210) to the user 310 (FIG. 3). In some examples, when a user 310 initiates the spatial audio mode in a location where that user 310 has previously initiated the spatial audio mode (e.g., as indicated by location sensors and/or the IMU in sensor system 36, smart device 280 and/or audio gateway 210), the directional audio selection engine 240 can provide the same set of audio samples previously available at that location. In other examples, a user 310 may have particular settings (e.g., in profile(s) 275 or default settings) dictating that particular audio content 265 or types of audio content 265 can be provided for selection at particular locations (or location types). In these cases, directional audio selection engine 240 can receive location information (e.g., from sensor system 36) and provide a location-specific selection of audio samples based upon that location information. A user 310 can have location-specific settings dictating sources of audio content 265 for home (e.g., a selection of relaxing playlists or stations), work (e.g., a selection of classical music playlists or stations), commute (e.g., a selection of audio books or podcasts), gym (e.g., a selection of up-tempo playlists or stations), etc. The directional audio selection engine 240 can receive the location information indicating a location of the audio device 10, and filter the sources of audio content 265 according to settings (e.g., user profile(s) 275) for that location.

In some cases, each of the audio samples provided to the user 310 as he/she moves between zones 320 in the array 330 includes an audio prompt or message including a descriptor of the content in each of those audio samples. For example, as user 310 initiates the spatial audio mode, the directional audio selection engine 240 can provide (e.g., render) an audio prompt overlayed with the audio sample. In some cases, the audio prompt and the audio sample are separate audio streams. However, in various implementations, the audio prompt and the audio sample can be combined in a single audio file. The audio prompt can include identification information or any descriptor of the content in each sample, such as, "Now playing: 'Dirty Water' by the Standells," or simply, "'Dirty Water' by the Standells." The audio prompt can further include a request for feedback, such as a request that user 310 actuate one or more actuation mechanisms (e.g., tactile, verbal, gestural) to like, dislike or otherwise judge the audio sample. In these examples, the audio prompt could say, "Shake your head to dislike; nod your head to like," or "Nod your head if you like this sample." The directional audio selection engine 240 can use its feedback logic to updated its query and selection processes (e.g., in logic 250) based upon the feedback from user 310.

In some cases, user settings (e.g., settings in user profile(s) 275) or default settings can be used by logic 250 to control functions based upon the user feedback. For example, user settings can indicate that negative feedback should revert playback to the spatial audio mode, with a new audio sample in the place of the negatively reviewed audio sample. In other cases, user settings can indicate that negative feedback should trigger a halt (stop) of the spatial audio mode, or revert back to a prior audio output (e.g., audio output prior to initializing spatial audio mode). In additional implementations, feedback can be solicited at a later time, e.g., via a mobile application or message at audio gateway 210 and/or smart device 280 in order to train feedback. As noted herein, in some implementations, the user 310 can exit the spatial audio mode without making a selection from samples associated with zones 320. In these cases, the user 310 can exit the spatial audio mode with a gesture, voice command or tactile command, which may differ from the type and/or sub-type of command used to initiate the spatial audio mode. Additionally, a timeout mechanism can close the spatial audio mode if a selection is not made within a prescribed period.

During operation, the directional audio selection engine 240 is configured to initiate playback of an audio sample corresponding with each of the spatially delineated zones 320 as the physical position of the audio device 10 (e.g., as indicated by the IMU or other sensors in sensor system 36 or other connected device) moves between the zones 320 in the array 330. With particular reference to the example of FIG. 3, upon initiating the spatial audio mode, the user 310 is provided with a first one of the audio samples corresponding with a first one of the spatially delineated zones 320, where the array 330 is defined relative to the physical position of the wearable audio device 10. In some cases, the initial zone 320A is associated with the current physical position of the audio device 10 at initiation of the spatial audio mode. The user can then change the physical position of the audio device 10 (e.g., as the user 310 moves his/her head X degrees) from the first physical position to a second physical position associated with a second one of the zones 320B, 320C, 320D, etc. During this operation, the directional audio selection engine 240 receives inertial information from the sensor system 36, e.g., the IMU at audio device 10 (FIG. 2) indicating movement of the audio device 10 between positions associated with different zones 320 in the array 330. Where the inertial information indicates movement of the audio device 10 between physical positions associated with zones 320 in the array 330, the directional audio selection engine 240 initiates playback of another audio sample (e.g., at transducer(s) 28 in audio device 10, or in another transducer in audio gateway 210 and/or smart device 280 (FIG. 2) corresponding with that zone 320.

In some cases, during the transition between audio samples (e.g., a first and second audio sample) in adjacent zones, the directional audio selection engine 240 can fade in/fade out those audio samples. For example, as the orientation of a user 310 moves within a first zone 320A toward a second (adjacent) zone 320B, the audio sample associated with first zone 320A can be faded out, and the audio sample associated with second zone 320B can be faded in. In some particular cases, if one sample (zone 320A) is centered at zero (0) degrees, and the adjacent sample (zone 320B) is centered at 30 degrees, the balance between the two (when user 310 is looking at 15 degrees) can be 50% of each sample. In certain cases, the fade out/fade in can be overlayed such that no break in playback occurs, however, in other cases, a clear break in playback can occur (e.g., via a pause or volume reduction, as described herein). According to other implementations, playback can be paused to delineate transition between zones 320A, 320B, etc. In some other implementations, the volume of playback can be modified in order to delineate transition between zones 320A, 320B, etc.

In particular implementations, as described further herein, the audio samples can be provided to the user 310 in a band-limited playback format. That is, the audio samples associated with each zone 320 can be provided (e.g., at transducer(s) 28 or other transducers in a connected component in system 200) in a band-limited playback. In various implementations, the band-limited playback includes spatially rendered playback of monaural sources. This spatially rendered playback of monaural sources can take multiple forms. For example, the sources of audio samples can be presented as monaural samples to the user 310, but in practice, the directional audio selection engine 240 can provide a stereo mix of multiple mono sources to place those samples in the physical space around user 310. In other cases, directional audio selection engine 240 provides monaural playback of each sample, e.g., to reduce latency. As described further herein, this playback can be differentiated from playback of the source of audio content 265 to further indicate to the user 310 that the directional audio selection engine 240 is operating in a selection mode.

In various implementations, the directional audio selection engine 240 is configured to perform predictive functions to enhance the user experience. For example, with particular reference to FIG. 2, in various implementations, the directional audio selection engine 240 can execute control functions at the audio gateway 210 or another device (e.g., smart device 280) separate from the audio device 10. That is, in particular cases, the directional audio selection engine 240 is configured to remotely control playback functions, including audio sample playback, as well as playback of the source of audio content 265 in response to a selection command, as described herein. In some configurations, playback operations at an audio device, as controlled at an audio gateway 210, can give the user 310 (FIG. 3) the perception of latency. For example, in some conventional configurations controlling audio playback at an audio device, latency of up to 200 milliseconds (ms) is perceived by the user of those devices. In these conventional configurations, the latency in audio transitions can cause disorientation, discomfort, and in some cases, nausea.

In order to address the latency present in some conventional configurations, directional audio selection engine 240 is configured to predict aspects of the user's behavior in order to provide a smooth, real-time transition between audio samples in the spatial audio mode. According to some implementations, directional audio selection engine 240 is configured to perform predictive functions by:

i) receiving inertial information indicating a current physical position of the audio device 10 from the inertial measurement unit (IMU) (e.g., in sensor system 36). The inertial information can indicate a relative position of the audio device 10 and an absolute movement from that relative position (e.g., positional change and/or orientation change);

ii) predicting a future physical position of the audio device 10 from the inertial information. In various implementations, a Kalman Filter is used to predict the head position of user 310, providing the predicted physical position of the audio device 10. This conventional filter utilizes a current position and velocity of the audio device 10 to make a prediction of the future physical location; and iii) rendering the audio sample(s) prior to (or during) movement of the audio device 10 from the current physical position to the predicted future physical position. In various implementations, the rendered audio sample includes at least one audio sample that is associated with the predicted future physical position of the audio device 10.

It is understood that the inertial information received from the sensor system 36 (e.g., IMU) may already exhibit latency with respect to the actual current position of the audio device 10, and that further latency is present between rendering the audio content 265 and the user 310 hearing that content at the audio device 10 (or other device). As such, the processes of predicting the future physical position of the audio device 10 and rendering the audio sample prior to, or during, movement of the audio device 10 can be performed with consideration for multiple latencies.

In various implementations, audibility of the rendered audio sample(s) is controlled based upon the current physical position and the predicted future physical position of the audio device 10. That is, while the directional audio selection engine 240 can render audio samples corresponding with a plurality of zones 320 at a given time, the engine 240 can make all but one of those audio samples inaudible to the user 310 at that time. In other cases, the directional audio selection engine 240 can pause all but one audio sample in order to provide the user 310 with a single audio sample for each of the zones 320 in the array.

In additional implementations, the predicted future physical position of the audio device 10 (along with the known current position of the audio device 10) can be used to predict which audio sample will be selected for playback as an audio file (or stream). In these implementations, directional audio selection engine 240 can render audio files prior to selection of their corresponding sample in order to reduce latency between the sample playback and the complete file (or stream) playback. For example, where a user 310 has already listened to one or more samples in zones 320 and has not selected those samples, directional audio selection engine 240 can render full audio files (or streams) for zones 320 in the direction which the audio device 10 is moving (as determined by sensor system 36, and noted herein).

In various implementations, logic 250 includes sensor data processing logic configured to process sensor data from sensor system 36 as well as any other sensors described with respect to audio gateway 210 and/or smart device 280, and provide a weighted localized representation to audio library lookup logic to enable fetching a type of audio content 265 for providing in the audio samples. That is, sensor data processing logic can include weightings or factoring for one or more of user preferences (e.g., user profile(s) 275), sensor data about past events (e.g., position and/or acceleration information about audio device 10 over given periods), audio files (e.g., audio samples of user's voices, or audio signatures such as ambient audio signatures, as sampled by microphone(s) in sensor system 36 or other devices), and other readily available data (e.g., a demographic profile of a plurality of users with at least one common attribute with the user 310, or a categorical popularity of audio content 265). The weighted localized representation may indicate a general characteristic of the location of user 310, etc., as a combination of factors from sensor data, profile(s) 275 and/or information from smart device 280. In particular examples, the weighted localized representation can be determined using at least one of a geofence, a local area network, a Bluetooth network, a cellular network, or a global positioning system (GPS), though other techniques may be used.

After processing sensor data with logic 250, additional audio library lookup logic can search audio library 260 for audio content 265 using the weighted localized representation from the sensor data processing logic. Library lookup logic may include a relational database with relationships between the weighted localized representation and audio content 265. As noted herein, audio library 260 can be locally stored at personal audio system 10, audio gateway 210, smart device 280, and/or stored at one or more remote or cloud-based servers. Library lookup logic can be continually updated based upon changes in audio library 260 in order to provide accurate, timely associations between the weighted localized representation from the sensor data processing logic and audio content 265. The library lookup logic can utilize the weighted localized representation to determine which audio samples should be provided to the user 310 according to the user profile 275 and/or proximity to a geographic location.

In some example implementations, directional audio selection engine 240 (e.g., using logic 250 including sensor data processing logic and/or library lookup logic) is configured to perform one or more of the following logic processes using data from sensor system 36 and/or other data accessible via profile system 270, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, directional audio selection engine 240 is configured to work in concert with sensor system 36 to continually monitor changes in one or more environmental conditions. In some cases, sensor system 36 may be set in an active mode, such as where a position tracking system such as the IMU pings nearby Wi-Fi networks to triangulate location of the audio device 10, or microphone(s) 18 and/or 24 (FIG. 1) remain in a "listen" mode for particular ambient sounds. In other implementations, sensor system 36 and directional audio selection engine 240 can be configured in a passive mode, such as where the network interface 34 at audio device 10 detects signals transmitted from nearby transceiver devices or network devices. In still other implementations, distinct sensors in the sensor system 36 can be set in distinct modes for detecting changes in environmental conditions and transmitting updated sensor data to directional audio selection engine 240. For example, some sensors in sensor system 36 can remain in an active mode while audio device 10 is active (e.g., powered on), while other sensors may remain in a passive mode for triggering by an event.

After listening to one or more of the samples in zones 320, the user 310 can select one of the plurality of audio samples for playback. As noted herein, the user 310 can make a selection command in any manner described with reference to the initiation command. For example, the user 310 can make a selection command via tactile actuation, voice actuation, gesture actuation, a UI command, etc. As with the initiation command, the selection command can be actuated at any connected device in system 200 (FIG. 2), e.g., at the audio device 10, audio gateway 210 and/or at the smart device 280. In some particular implementations, the selection command is actuated by a distinct actuation mechanism than the initiation command. For example, in some cases, the initiation command can include a tactile command (e.g., detectable by a tactile sensor in sensor system 36) such as a tap or multi-tap on one or more surfaces of the audio device 10. In these cases, the selection command can include any other actuation mechanism that does not include the tactile command triggering the spatial audio mode. In particular examples of this scenario, the selection command can be triggered by a distinct tactile command (e.g., a touch-and-hold command, or different tap command), or a gesture actuation such as a nod of the head as detectable by the sensor system 36 at the audio device 10. In addition to, or in place of the tactile sensor, the sensor system 36, as noted herein, can include an IMU, which may be particularly well suited to detect gestures.

It is further understood that other devices such as audio gateway 210 and/or smart device 280 can receive selection commands and initiate functions by the directional audio selection engine 240 based upon those selection commands. For example, the user 310 can actuate a selection command at the smart device 280, e.g., where smart device 280 includes a smart phone or wearable smart device such as a smart watch, with gesture detection (e.g., gyroscope/accelerometer/magnetometer), voice detection (e.g., with one or more microphones) and/or a user interface permitting actuation by user 310. In other cases, the audio gateway 210 can include a smart phone or smart speaker with at least one of the above-noted detection or user interface functions. For example, the audio gateway 210 can include a smart speaker with voice detection and/or a user interface permitting actuation by user 310.

In some implementations, with continuing reference to FIG. 2, directional audio selection engine 240 is further configured to initiate playback of the source of audio content 265 associated with the selected audio sample, piece of information, or choice. That is, after receiving the selection command (e.g., from audio device 10, audio gateway 210 and/or smart device 280), the directional audio selection engine 240 is configured to initiate playback from the audio content source, e.g., of a complete audio file or audio stream associated with the audio sample, piece of information, or choice. In some cases, playback of the source of audio content 265 can continue fluidly from the audio sample which the user 310 selected, or can revert to another portion of the audio content 265, e.g., the beginning of a song or the introduction to an audio book. In certain implementations, after selection of audio content 265 for playback, audio content 265 from other streams (other zones 320) is no longer rendered. That is, after selection of one of the zones 320 for playback of associated audio content 265, user 310 must re-initiate the spatial audio mode to select a different stream of audio content 265.

According to various implementations, playback of the source of audio content 265 can be provided from any of the connected devices in system 200. In certain implementations, playback can be coordinated across multiple devices, e.g., the audio device 10, audio gateway 210 and/or smart device 280. For example, position information from sensors 36 can be obtained from audio device 10 and used to adjust playback at devices as the user (and audio device 10) moves relative to the audio gateway 210 and/or smart device 280.

In additional implementations, in response to the selection command, playback of the source of audio content 265 (associated with the selected sample) includes a full-bandwidth playback of that source of audio content 265. In these cases, as noted herein, the audio sample can include a band-limited playback of the sample of audio content 265. In contrast, after user 310 selects audio content 265 for full playback, that audio content 265 can be provided in full-bandwidth playback. In particular cases, the full-bandwidth playback includes a stereo playback, which can further indicate to the user 310 that the selection command has been received.

In particular additional implementations, audio samples can be provided to the user 310 in a directory format, including a parent directory of associated sources of audio content 265, and a child directory of the parent directory. That is, in response to the selection command selecting one of the audio samples associated with zones 320, the directional audio selection engine 240 provides a subsequent plurality of audio samples corresponding with the spatially delineated zones 320 to the user 310. In some cases, the subsequent plurality of audio samples are provided in the same set of zones 320, or a newly aligned set of zones 320, based upon the position of the user 310 when making the first selection command. As noted herein, the subsequent plurality of audio samples can include a child group of the initial (parent) plurality of audio samples. For example, the parent audio samples can correspond with categories of audio content 265 (e.g., genres of music, audio books, or shopping categories), while the child audio samples can correspond with sub-categories of each of the parent categories of that audio content 265 (e.g., particular songs or artists in the case of a music category, particular books in a genre of audio books, or particular items for purchase in categories of goods). In some cases, the directional audio selection engine 240 provides the subsequent plurality of audio samples in the directory configuration in a band-limited playback.

While directional audio selection engine 240 can have useful applications in terms of playback of music, Internet radio, podcasts, audio books or other program-style content, the directional audio selection engine 240 can have various additional applications. For example, with continuing reference to FIGS. 2 and 3, directional audio selection engine 240 can be configured to provide any audibly presentable material to the user 310 in the form of distinct playback zones. In particular examples, directional audio selection engine 240 can be useful in commercial applications such as online shopping. In these cases, the user 310 can initiate the spatial audio mode of directional audio selection engine 240 to provide a plurality of shopping options associated with zones 320. Each audio sample can include a listing of goods or services for purchase, such as an order of goods or services commonly purchased by the user 310. The directional audio selection engine 240 can utilize user profile(s) 275, e.g., from linked shopping accounts such as those provided by online or brick-and-mortar retailers to select frequently ordered items associated with the user 310. In additional implementations, the directional audio selection engine 240 can obtain profile(s) 275 from other linked devices, e.g., in the user's home, office, etc. to determine which products or services may be desirable. For example, the profile(s) 275 can include information from smart home appliances about the need for maintenance or supplemental parts (e.g., light bulbs or coffee filters). In a particular example, after initiating the spatial audio mode, the user 310 is presented with audio samples including product jingles, voice overlay(s), and/or vocal descriptions of products for purchase/re-purchase. One set of samples associated with zones 320 can include:

Zone 320A: "Re-order one gallon of Brand X milk"
Zone 320B: "Re-order Store Brand paper towels"
Zone 320C: "Order light bulbs for lamp from Store."
Zone 320D: "Buy ink for Brand Y printer."

As described herein, the user 310 can make a selection command, e.g., via audio device 10, and initiate the order associated with the selected zone 320.

In still further implementations, the directional audio selection engine 240 is configured to enhance virtual reality (VR) and/or augmented reality (AR) experiences, for example, by providing audio content 265 associated with one or more objects visible to a user (e.g., user 310) in a VR or AR environment. For example, where audio device 10 includes a wearable audio device such as smart glasses, or a VR and/or AR headset, directional audio selection engine 240 can obtain data from the sensor system 36 about the virtual/augmented environment experienced by the user 310, and provide relevant audio samples for selection based upon that VR/AR environment. For example, where a user 310 is looking at distinct items in a virtual store (or augmented physical store), the directional audio selection engine 240 can provide audio playback of descriptions of those items.

In some cases, the directional audio selection engine 240 can convey multiple layers of information in the VR/AR environment. For example, audio content 265 can be provided to user 310 as layered information, such that initial audio content 265 (e.g., identification information) is provided when user 310 initially interacts with an object in the VR/AR environment. Additional commands (e.g., gestures) can unwrap additional information about the object. For example, user 310 can interact with the object in the VR/AR environment, e.g., by looking at the object. Directional audio selection engine 240 can provide identification information about that object (e.g., "These are portable speakers from company X") when the user 310 looks in that object's direction (e.g., using zones or other spatial indicators described herein). User 310 can provide an additional command (e.g., head nod, double tap, voice command) to get additional information about the object (e.g., "Company X's patented noise cancelling technology allows for an ideal customer experience."). An additional command from user 310 can provide further information, such as a reviews from other user(s) or trusted sources (e.g., "Amy says: 'These are the best speakers I have ever purchased.'"). These additional layers of information can be contextually and/or preferentially configured, e.g., according to settings in user profile(s) 275, such that information is provided from trusted and/or preferred sources.

In additional implementations, the microphone(s) in sensor system 36, audio gateway 210 and/or smart device 280 can be utilized to detect ambient audio signals proximate the audio device 10. The directional audio selection engine 240 can be configured to modify playback of the audio content 265 (and/or samples of sources of audio content 265) at the audio device 10 based upon that ambient audio signal. For example, the directional audio selection engine 240 can be configured, based upon default settings, user-defined settings, message-provider preferences, etc., to modify the audio playback in the spatial audio mode according to the ambient audio signal received at sensor system 36 (e.g., microphone(s) 18 and/or 24).

As noted herein, in various embodiments, directional audio selection engine 240 can solicit feedback about the spatial audio mode via a feedback prompt, such as an audio prompt. For example, a feedback prompt can include a phrase such as "Did you enjoy this audio sample selection?", or "Would you like to continue this audio stream?" Additionally, in some cases, the audio prompt can include one or more tones. Feedback prompt can include any spoken phrase, word or clause intended to elicit a response from user 310, or can include a displayed prompt (e.g., similar to audio phrase, or with a Yes/No/Maybe or other visual prompt with touch-screen or push-button response capabilities), such as a prompt displayed at audio gateway 210 and/or smart device 280 or other device within range of user 310. In various implementations, a feedback prompt can be provided to the user 310 without an intervening audio input from user 310, such that user 310 is not required to prompt directional audio selection engine 240 (e.g., by using an initiation term such as a name) in order to provide feedback. That is, in the case of eliciting verbal feedback the control circuit 30 can maintain the microphone(s) in sensor system 36 in a query mode during playback of the audio content 265 (and may do similarly with samples of that audio content 265), such that the system actively awaits a response from the user 310. In some implementations, microphone(s) can remain in an optional response mode while providing the audio content 265 and/or feedback prompt. That is, control circuit 30 can maintain microphone(s) in a listen mode for a set period, with an expectation that user 310 may or may not respond (e.g., with a "Thanks," compliment or other feedback about the audio content 265 and/or feedback prompt). Additionally, other sensors in sensor system 36, such as the IMU, can be configured to remain in a query mode and/or optional response mode for a prescribed period in order to receive feedback from user 310.

In some cases, feedback from user 310 is processed by logic 250, e.g., feedback logic in order to improve functions of directional audio selection engine 240. In some cases, where feedback inputs include an audio signal, the feedback logic may analyze those inputs using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio content 265 can include "text" metadata, which can allow directional audio selection engine 240 to perform metadata feature extraction on those files (or streams) of content. This metadata feature extraction can include, for example, matching and linking features to a database (e.g., audio library 260) and/or retrieving/analyzing additional audio and semantic attributes of the audio content 265, e.g., genre, mood, themes or related artists. Directional audio selection engine 240 (and logic 250 therein) can use these acoustic, gestural or other feedback from user 310, and metadata features from audio content 265, to perform statistical and probabilistic modeling in order to recommend or select other future audio content 265 and/or recommend audio content 265 (e.g., radio stations, albums, playlists or artists) in accordance with other functions.

In some cases, feedback logic can be configured to teach sensor data processing logic and/or library lookup logic about preferences of user 310, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic can be configured to analyze feedback and enhance future operations of directional audio selection engine 240. It is further understood that logic 250, including feedback logic, library lookup logic and/or sensor data processing logic may be interconnected in such a manner that these components act in concert or in reliance upon one another.

Figure 4:
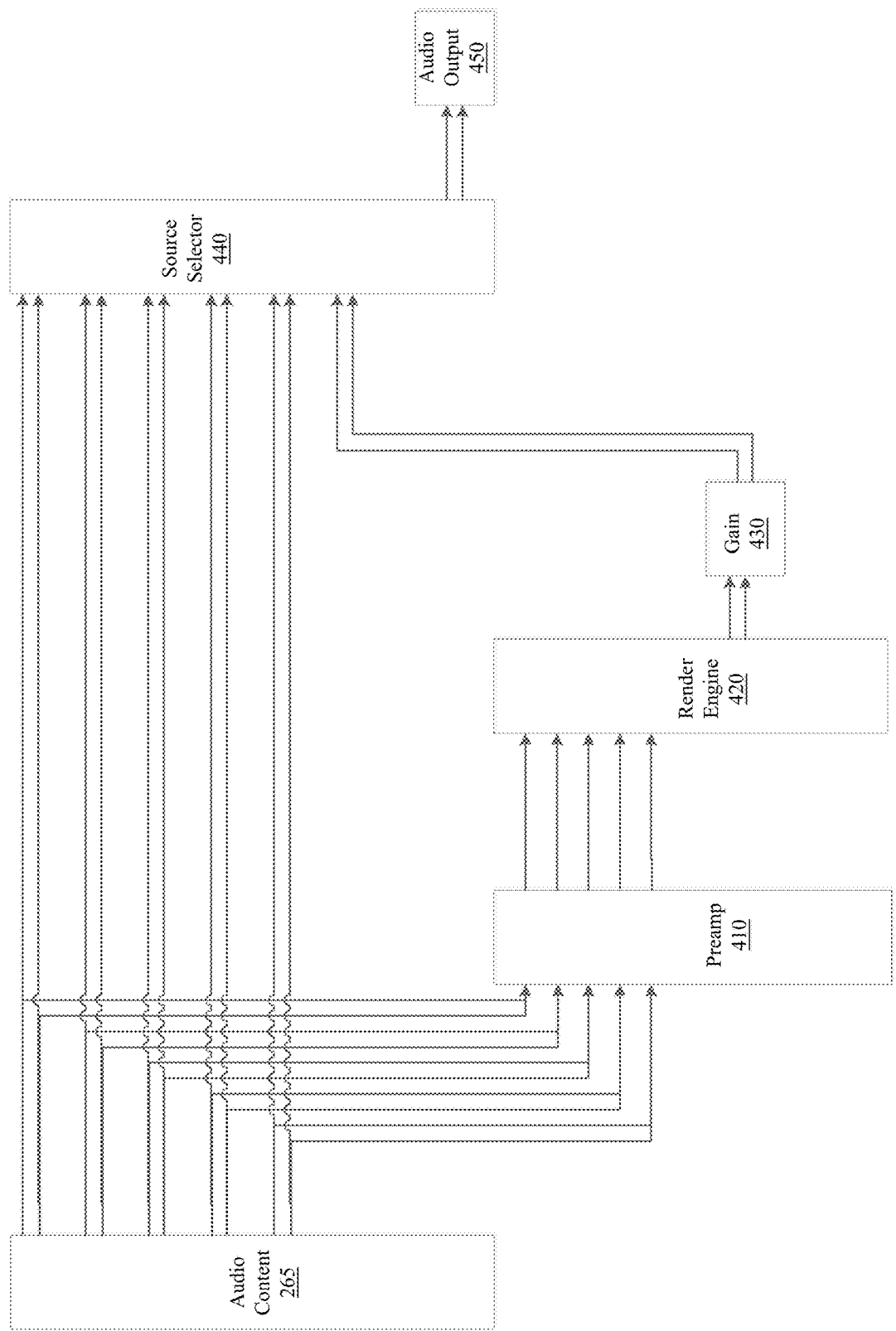
FIG. 4 shows a system view of hardware and/or software components in a control system according to various implementations.
Figure 5:
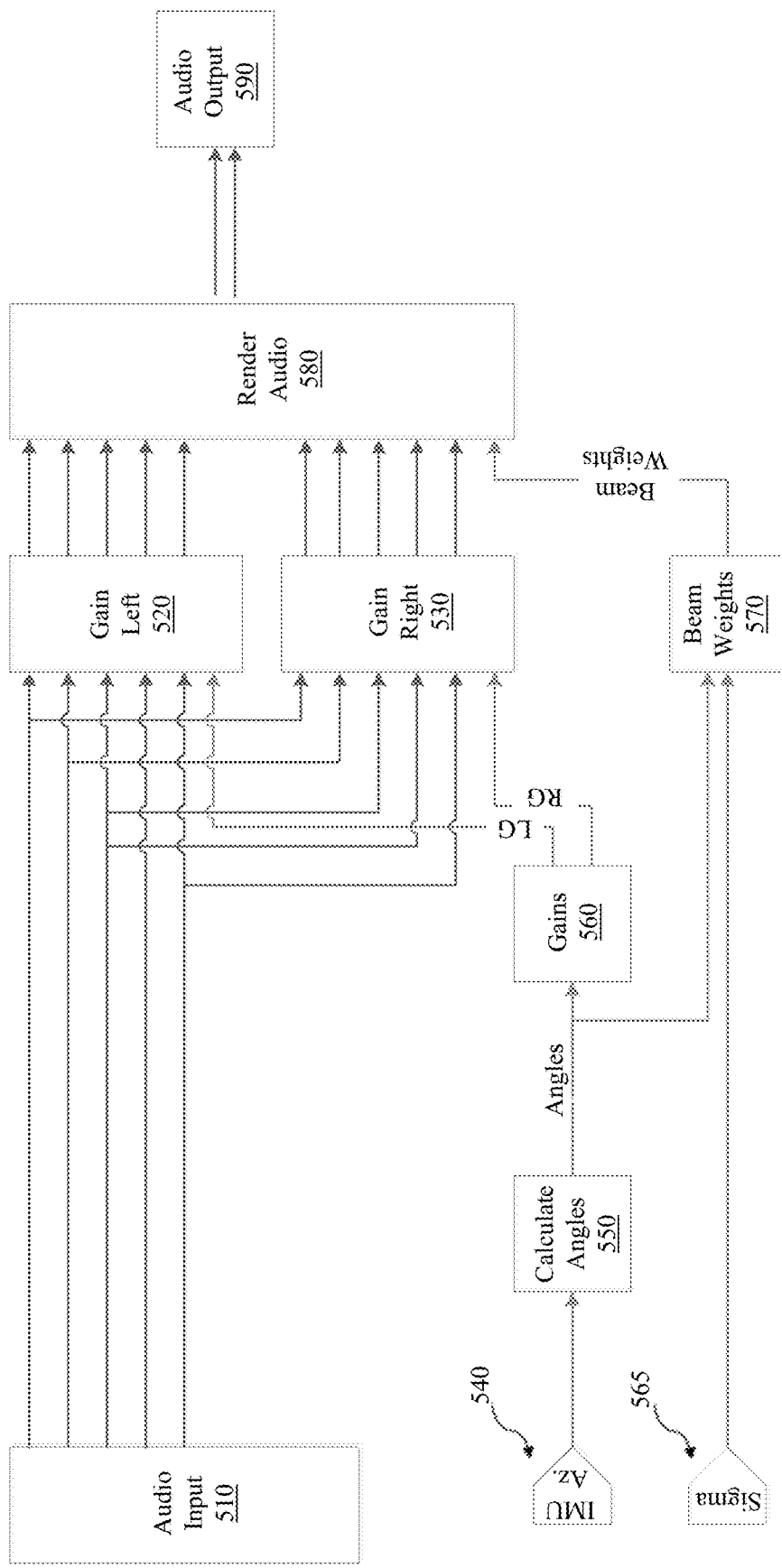
FIG. 5 is a flow diagram illustrating functions performed in rendering audio content in accordance with various particular implementations.
Figure 6:
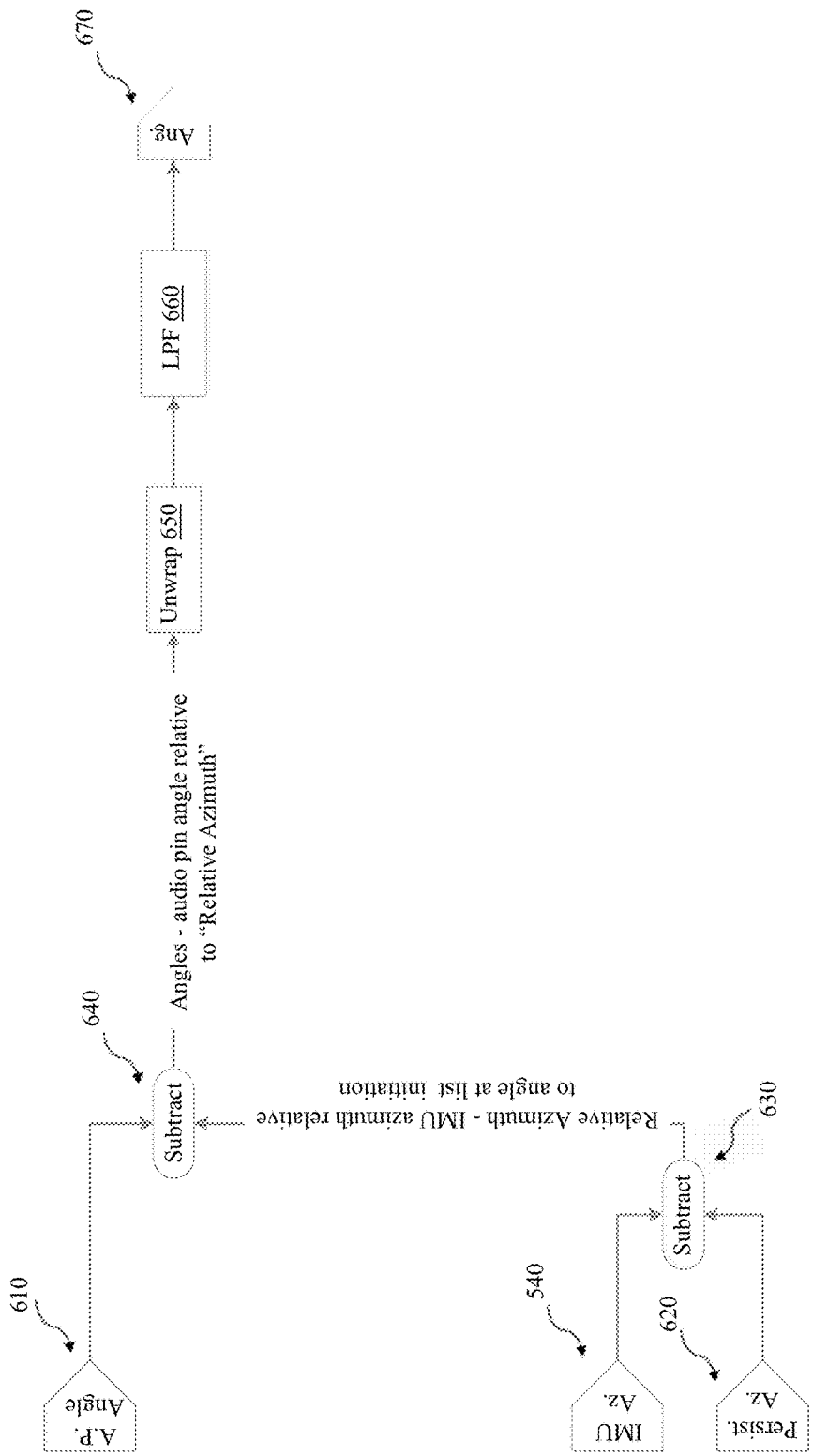
FIG. 6 is a flow diagram illustrating functions performed in calculating angles between zones in an array to provide spatial audio according to various particular implementations.
Figure 7:
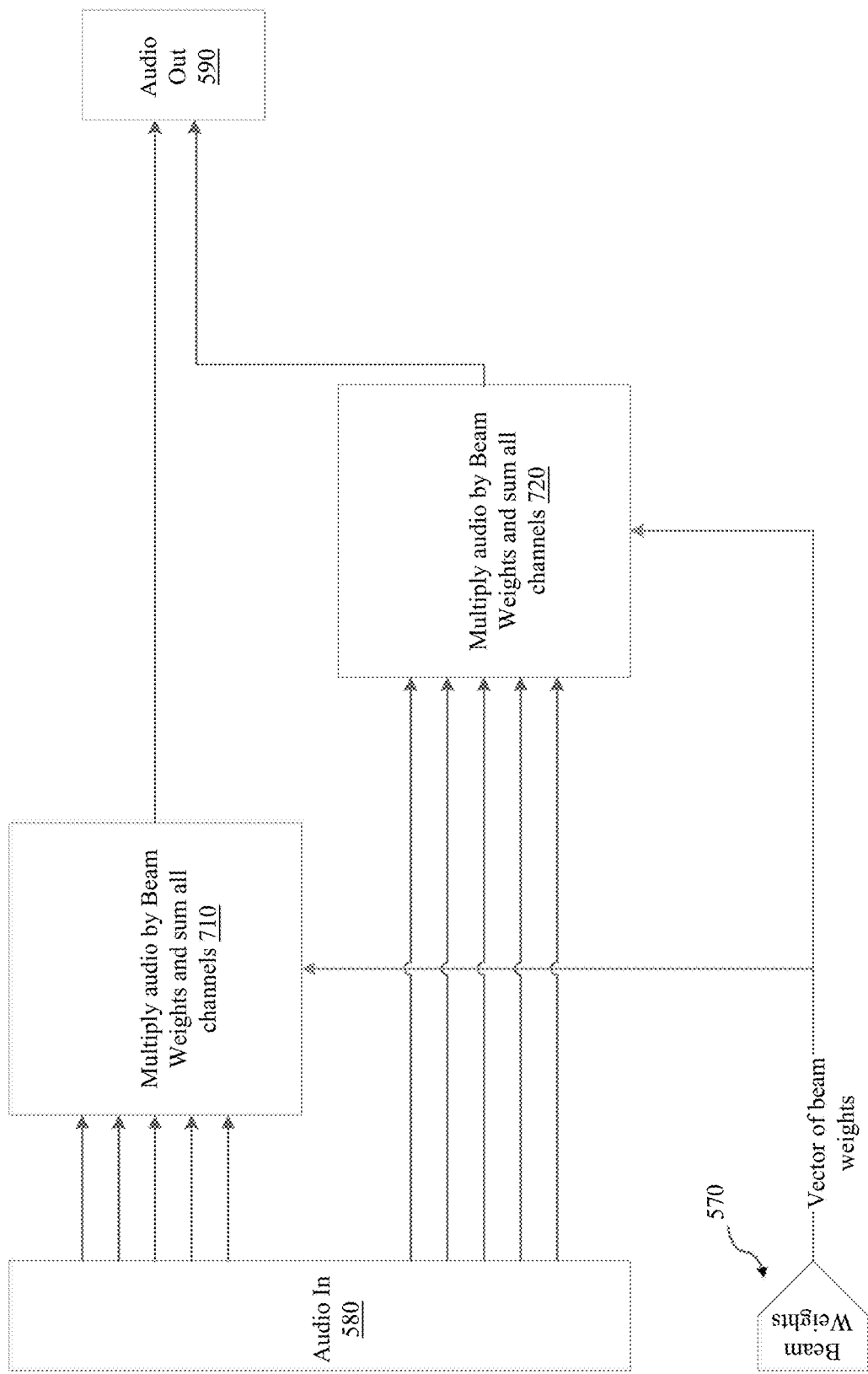
FIG. 7 is a flow diagram illustrating additional functions in rendering audio content according to various particular implementations.
Figure 8:
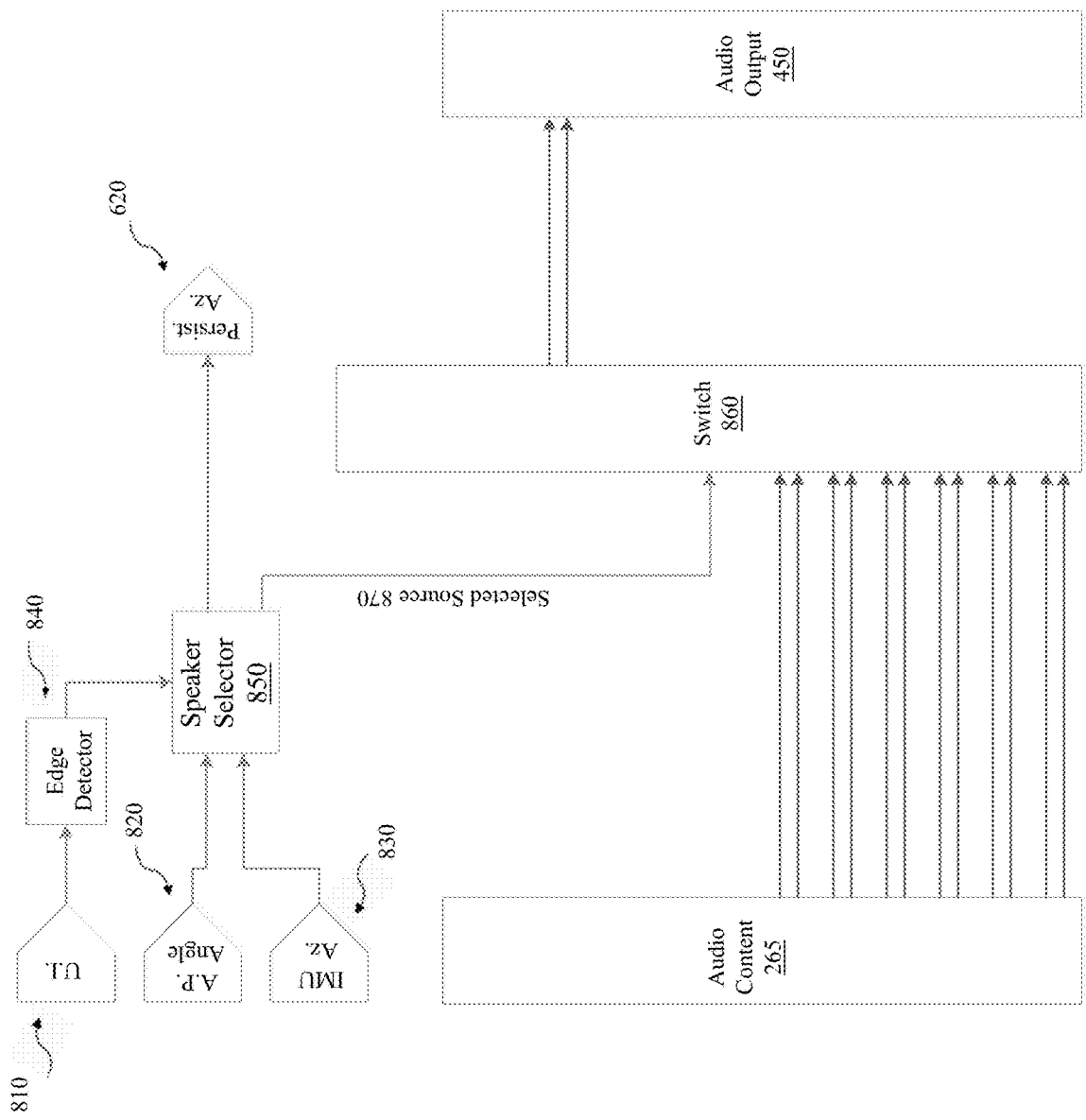
FIG. 8 is a flow diagram illustrating functions in selecting source(s) of audio content according to various particular implementations.

FIGS. 4-8 are data flow diagrams illustrating example control process performed by the control system 230, including directional audio selection engine 240, according to various particular implementations. FIG. 4 illustrates a top-level system view of hardware and/or software components in the control system 230. FIG. 5 illustrates functions performed in rendering the audio content 265 in accordance with various particular implementations. FIG. 6 illustrates functions performed in calculating angles between zones 320 in array 330 (FIG. 3) to provide spatial audio according to various particular implementations. FIG. 7 illustrates additional functions in rendering audio content 265 according to various particular implementations. FIG. 8 illustrates functions in selecting source(s) of audio content 265 according to various particular implementations. FIGS. 4-8 are referred to with continuing reference to FIGS. 1-3.

Turning to FIG. 4, in this example scenario, five (5) sources of audio content 265 (FIG. 2) are available for selection by the user. In this example implementation, each source of audio content 265 includes stereo audio content. A preamp 410 is used to convert a first stream of each source of the audio content 265 to monaural content, using a sum/2 calculation. Next, a rendering engine 420 can provide spatial list content to the user 310. The spatial list content can include a spatially rendered array of monaural audio samples. A gain 430 is applied to the spatial list content to match the stereo sources in audio content 265. After applying gain 430, the spatial list content is sent to a source selector 440, which receives the modified spatial list content as well as the stereo audio content 265 in a second stream from the audio source(s). The source selector 440 permits switching of audio content 265 in response to the user 310 movement across the array 330 of zones 320 (FIG. 3). Once a source of audio content 265 is selected, an audio output 450 is provided to the user 310, e.g., at the audio device 10.

FIG. 5 illustrates a detailed view of processes performed by rendering engine 420 in the system diagram of FIG. 4. As shown, the audio input 510 from preamp 410 is received, and distinct right and left gains (gain left 520, gain right 530) are applied to that audio input 510. The gains 520, 530 can be applied, for example, based upon a current angle of the IMU (or data from other sensors). In this example implementation, parameters including the IMU azimuth angle 540 are obtained from the sensor system 36 (FIG. 2), and rendering angles 550 for each of the zones 320 are calculated with those parameters. Gains 560 are used to place each of the sources of audio input 510 in space in the array 330 (FIG. 3) (e.g., by defining zones 320 in space) based upon the rendering angles 550, thereby defining the gain left 520 and gain right 530. Additionally, a sigma value 565 (parameter) is used, along with the rendering angles 550, to assign beam weights 570, which control how wide each zone 320 (i.e., source of audio content 265) appears in space. The gain left 520, gain right 530 and beam weights 570 are used to render audio 580 and provide that audio as output 590 to the stereo gain 430 (FIG. 4).

FIG. 6 illustrates a detailed view of processes performed in calculating rendering angles 550 in FIG. 5. As shown in FIG. 6, a set of inputs include: an audio pin angle 610 (e.g., the location of audio pins in azimuth), the current IMU azimuth angle 540 (FIG. 5), and a persistent azimuth angle 620 (e.g., the azimuth from the IMU at the moment the spatial audio mode was initiated). The audio pin angle 610 is a vector of size NumberOfPins (where pins are equivalent to audio sources as provided in distinct zones 320). Additionally, the IMU azimuth angle 540 and the persistent azimuth angle 620 are real numbers. A subtraction function 630 is performed, whereby the current IMU azimuth angle 540 is subtracted from the persistent azimuth angle 620 to give a relative azimuth value. The relative azimuth value is equal to the IMU azimuth relative to the angle at initiation of the spatial audio mode. An additional subtraction function 640 is performed, whereby the audio pin angle 610 is subtracted from the relative azimuth value to provide an audio pin angle relative to the relative azimuth value. This angle is unwrapped 650, and passed through a low-pass filter (LPF) 660 (e.g., at a first order at approximately 30 hertz), providing angles 670 at which to render the monaural sources of audio content. Angles 670 is a vector of size NumberOfPins (i.e., number of audio sources).

FIG. 7 illustrates a detailed view of processes performed in render audio 580, as first described with respect to FIG. 5. Gain left 520 and gain right 530 position the pin (audio output) in space (i.e., left/right balance), while beam weights 570 control the width of each pin (i.e., the width of the user's hearing) in order to enable "focusing" of the audio scene. That is, a narrow focus may only allow the user 310 to hear one source of audio content 325 at a time, while a wider focus may allow the user to hear multiple, overlapping sources 325 at the same time. Processes 710, 720 apply the calculated beam weights 570 (FIG. 5) to audio 580 to produce audio output 590.

FIG. 8 illustrates a detailed view of processes performed by source selector 440, as first described with respect to FIG. 4. As shown in FIG. 8, input parameters to the speaker selector 850 can include: user interface input(s) 810, audio pin angle 820 and IMU azimuth angle 830. The user interface input 810 is sent to a conventional edge detector 840 for detecting when the spatial audio mode is selected, prior to input at speaker selector 850. When user interface input(s) 810 are detected (e.g., at audio device 10 or other connected devices) and the spatial audio mode is engaged, the IMU azimuth 830 at the instant of engagement is stored for use internal to the speaker selector 850, and simultaneously output as the persistent azimuth parameter 620. While spatial audio mode is active, audio pin angle 820 is used as an input, as well as IMU azimuth angle 830 and persistent azimuth 620 to calculate which spatially rendered audio source is closest to the physical orientation of the audio device 10. This process determines the selected source parameter 870. Upon detecting additional input from the user interface 810 indicating that a selection has been made, the selected source parameter 870 is sent to the switch 860, changing the audio output 450 from spatial audio content to the selected content.

In some cases, the directional audio selection engine 240 can be utilized with a mobile application, such as an application accessible on the audio device 10 or the smart device 280, and can provide an actuatable mechanism (e.g., an interface control, audio control or tactile control) for saving or modifying settings and preferences. The mobile application can be accessible via a conventional application store, and can be downloadable and capable of storage and/or access (e.g., via distributed or cloud computing access) via one or more of the audio device 10, audio gateway 210, and smart device 280.

As noted herein, in contrast to conventional audio systems, the audio device 10 disclosed according to various implementations can allow a user 310 to experience spatial audio selection without the need to interact with a user interface, such as those user interface operations conventionally controlled by an audio gateway. Even further, the audio device 10 disclosed according to various implementations can permit the user 310 to select audio playback without visual cues. Additionally, the audio device 10 can allow the user 310 to sample choices of audio content 265 before making a selection. This improves the user experience when compared to text or graphical information (e.g., provided via a smart device) about that audio content 265, where the user does not hear a preview or sample of that content prior to making the selection.

The functionality described herein, or portions thereof, and its various modifications (hereinafter "the functions"), can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a wearable audio device, the method comprising:
   receiving an initiation command to initiate a spatial audio mode;
   providing a plurality of audio choices corresponding with spatially delineated zones in an array defined relative to a physical position of the wearable audio device, in response to the initiation command, wherein each audio choice is associated with a prescribed action, wherein the plurality of audio choices are specific to a detected geographic location of the wearable audio device;
   receiving a selection command selecting one of the plurality of audio choices; and
   taking one of the prescribed actions in response to receiving the selection command.

2. The computer-implemented method of claim 1, wherein the plurality of audio choices comprise audio samples associated with sources of audio content, and wherein the prescribed action comprises playing the source of the audio content associated with an audio choice in response to receiving the selection command.

3. The computer-implemented method of claim 1, wherein the plurality of audio choices comprise at least one of: music choices, navigation or directional choices, news source choices, audio messages, general information about a detected location of the wearable audio device, safety alerts, audio pins specific to the detected location of the wearable audio device, or audio beacons.

4. The computer-implemented method of claim 1, wherein the prescribed action comprises playing additional audio content associated with each of the plurality of audio choices.

5. The computer-implemented method of claim 1, wherein the plurality of audio choices comprise product ordering choices, and wherein the prescribed actions comprise ordering a product associated with each of the product ordering choices.

6. The computer-implemented method of claim 1, wherein the initiation command comprises at least one of a tactile actuation, gesture actuation or a voice command at the wearable audio device or another device, and wherein the selection command comprises at least one of a tactile actuation, gesture actuation, or voice command at the wearable audio device or the another device.

7. The computer-implemented method of claim 1, wherein providing the plurality of audio choices comprises initiating playback of an audio choice corresponding with each of the spatially delineated zones as the physical position of the wearable audio device moves between the spatially delineated zones in the array,
   wherein the array of spatially delineated zones comprises a one-dimensional array or a two-dimensional array, and
   wherein a size of each of the spatially delineated zones is unequally distributed in the array.

8. The computer-implemented method of claim 1, wherein the spatially delineated zones are arranged in a pattern in the array based upon a characteristic of the source of the audio choices.

9. The computer-implemented method of claim 1, wherein a user of the wearable audio device, upon initiating the spatial audio mode, is provided with a first one of the plurality of audio choices corresponding with a first one of the spatially delineated zones in the array defined relative to the physical position of the wearable audio device, and in response to a change in the physical position of the wearable audio device to a physical position associated with a second one of the spatially delineated zones, a second one of the plurality of audio choices is provided at the wearable audio device.

10. The computer-implemented method of claim 1, wherein a span of the array is modified based on a current position of a user of the wearable audio device,
    wherein in response to determining that the user of the wearable audio device is sitting, the span of the array is set to a first span, and
    wherein in response to determining that the user of the wearable audio device is standing, the span of the array is set to a second span,
    wherein the second span is greater than the first span.

11. A system comprising:
    a wearable audio device comprising:
       an acoustic transducer having a sound-radiating surface for providing an audio output; and
    a control system coupled with the wearable audio device, the control system configured to:
       receive an initiation command to initiate a spatial audio mode;

provide a plurality of audio choices corresponding with spatially delineated zones in an array defined relative to a physical position of the wearable audio device, in response to the initiation command, wherein each audio choice is associated with a prescribed action, wherein the plurality of audio choices comprise product ordering choices comprising a listing of goods or services for purchase, wherein the product ordering choices are selected based on a profile for a user of the wearable audio device, and wherein the prescribed actions comprise ordering a product associated with each of the product ordering choices;

receive a selection command selecting one of the plurality of audio choices; and take one of the prescribed actions in response to receiving the selection command.

12. The system of claim 11, further comprising:
a tactile sensor coupled with the control system; and
an inertial measurement unit (IMU) coupled with the control system,
wherein the initiation command comprises a tactile actuation at the tactile sensor, and
wherein the selection command comprises at least one of a tactile actuation at the tactile sensor or a gesture actuation detectable by the IMU.

13. The system of claim 11, wherein the plurality of audio choices comprise audio samples associated with sources of audio content, and wherein the prescribed action comprises playing the source of the audio content associated with an audio choice in response to receiving the selection command.

14. The system of claim 11, wherein the plurality of audio choices are settings-specific or specific to a detected geographic location of the wearable audio device, wherein the prescribed actions comprise playing additional audio content associated with each of the plurality of audio choices.

15. The system of claim 11, wherein providing the plurality of audio choices comprises initiating playback of an audio choice corresponding with each of the spatially delineated zones as the physical position of the wearable audio device moves between the spatially delineated zones in the array, wherein the array of spatially delineated zones comprises a one-dimensional array or a two-dimensional array, and wherein the spatially delineated zones are arranged in a pattern in the array based upon a characteristic of the source of the audio choices.

16. The system of claim 11, wherein a user of the wearable audio device, upon initiating the spatial audio mode, is provided with a first one of the plurality of audio choices corresponding with a first one of the spatially delineated zones in the array defined relative to the physical position of the wearable audio device, and in response to a change in the physical position of the wearable audio device to a physical position associated with a second one of the spatially delineated zones, a second one of the plurality of audio choices is provided at the wearable audio device.

17. The system of claim 11, wherein the product ordering choices include audio output of at least one of: a product jingle associated with each product, a voice overlay with a product jingle associated with each product or a vocal description of each product.

18. A computer-implemented method of controlling a wearable audio device, the method comprising:
receiving an initiation command to initiate a spatial audio mode;
providing a plurality of audio choices corresponding with spatially delineated zones in an array defined relative to a physical position of the wearable audio device, in response to the initiation command, wherein each audio choice is associated with a prescribed action,
wherein the array of spatially delineated zones comprises a one-dimensional array or a two-dimensional array,
wherein a size of each of the spatially delineated zones is unequally distributed in the array;
receiving a selection command selecting one of the plurality of audio choices; and
taking one of the prescribed actions in response to receiving the selection command.

19. The computer-implemented method of claim 18, wherein spatially delineated zones closer to a center of the array are larger than terminal zones at a periphery of the array, and wherein the larger zones are assigned based on at least one of: a preference of a user of the wearable audio device user, or a likelihood of selection by the user.

20. The computer-implemented method of claim 18, wherein spatially delineated zones closer to a center of the array are smaller than terminal zones at a periphery of the array, and wherein the larger terminal zones mitigate over-rotation by a user of the wearable audio device.

* * * * *